US011142681B2

(12) United States Patent
Wang et al.

(10) Patent No.: US 11,142,681 B2
(45) Date of Patent: Oct. 12, 2021

(54) CHASING SOLVENT FOR ENHANCED RECOVERY PROCESSES

(71) Applicants: Jianlin Wang, Calgary (CA); Weidong Guo, Houston, TX (US); Lu Dong, Calgary (CA); Chen Fang, Houston, TX (US); Mathew D. Suitor, Calgary (CA)

(72) Inventors: Jianlin Wang, Calgary (CA); Weidong Guo, Houston, TX (US); Lu Dong, Calgary (CA); Chen Fang, Houston, TX (US); Mathew D. Suitor, Calgary (CA)

(73) Assignee: ExxonMobil Upstream Research Company, Spring, TX (US)

(*) Notice: Subject to any disclaimer, the term of this patent is extended or adjusted under 35 U.S.C. 154(b) by 175 days.

(21) Appl. No.: 16/003,840

(22) Filed: Jun. 8, 2018

(65) Prior Publication Data

US 2019/0002755 A1 Jan. 3, 2019

(30) Foreign Application Priority Data

Jun. 29, 2017 (CA) .................. CA 2972203

(51) Int. Cl.
*C09K 8/594* (2006.01)
*E21B 43/16* (2006.01)
(Continued)

(52) U.S. Cl.
CPC .............. *C09K 8/594* (2013.01); *C09K 8/592* (2013.01); *E21B 43/16* (2013.01); *E21B 43/2408* (2013.01)

(58) Field of Classification Search
CPC ...... E21B 43/2408; E21B 43/24; E21B 43/16; E21B 43/168; E21B 43/164;
(Continued)

(56) References Cited

U.S. PATENT DOCUMENTS 1,422,204 A 7/1922 Hoover et al.
1,491,138 A 4/1924 Hixon
(Continued)

FOREIGN PATENT DOCUMENTS

CA 0603924 A 8/1960
CA 0836325 A 3/1970
(Continued)

OTHER PUBLICATIONS

Lim, G. B., et al., (1996) "Three-dimensional Scaled Physical Modeling of Solvent Vapour Extraction of Cold Lake Bitumen," The Journal of Canadian Petroleum Technology, (April) 35(4), pp. 32-40.
(Continued)

*Primary Examiner* — Angela M DiTrani Leff
(74) *Attorney, Agent, or Firm* — ExxonMobil Upstream Research Company—Law Department

(57) ABSTRACT

Methods to optimize solvent use in solvent-dominated processes for recovery of hydrocarbons. Methods include injecting a solvent composition into a reservoir at a pressure above a liquid/vapor phase change of the solvent composition; injecting a chaser into the reservoir at a pressure above the liquid/vapor phase change of the solvent composition; allowing the solvent composition to mix with hydrocarbons in the reservoir and at least partially dissolve into the hydrocarbons to produce a solvent/hydrocarbon mixture; reducing the pressure in the reservoir below the liquid/vapor phase change pressure of the solvent composition thereby flowing at least a fraction of the solvent/hydrocarbon mixture from the reservoir; and repeating these steps as required.

23 Claims, 6 Drawing Sheets

(51) Int. Cl.
*C09K 8/592* (2006.01)
*E21B 43/24* (2006.01)

(58) Field of Classification Search
CPC ..... E21B 43/166; E21B 43/1668; C09K 8/58; C09K 8/592; C09K 8/594
See application file for complete search history.

(56) References Cited

U.S. PATENT DOCUMENTS

| | | |
|---|---|---|
| 2,365,591 A | 12/1944 | Ranney |
| 2,412,765 A | 12/1946 | Buddrus |
| 2,813,583 A | 11/1957 | Marx et al. |
| 2,859,818 A | 11/1958 | Hall et al. |
| 2,862,558 A | 12/1958 | Dixon |
| 2,910,123 A | 1/1959 | Elkins et al. |
| 2,876,838 A | 3/1959 | Williams |
| 2,881,838 A | 4/1959 | Morse et al. |
| 2,909,224 A | 10/1959 | Allen |
| 3,126,961 A | 3/1964 | Craig, Jr. et al. |
| 3,156,299 A | 11/1964 | Trantham |
| 3,163,215 A | 12/1964 | Stratton |
| 3,174,544 A | 3/1965 | Campion et al. |
| 3,182,722 A | 5/1965 | Reed |
| 3,205,944 A | 9/1965 | Walton |
| 3,221,809 A | 12/1965 | Walton |
| 3,232,345 A | 2/1966 | Trantham et al. |
| 3,237,689 A | 3/1966 | Justheim |
| 3,246,693 A | 4/1966 | Crider |
| 3,280,909 A | 10/1966 | Closmann et al. |
| 3,294,167 A | 12/1966 | Vogel |
| 3,310,109 A | 3/1967 | Marx et al. |
| 3,314,476 A | 4/1967 | Staples et al. |
| 3,315,745 A | 4/1967 | Rees, Jr. |
| 3,322,194 A | 5/1967 | Strubbar |
| 3,332,482 A | 7/1967 | Trantham |
| 3,333,632 A | 8/1967 | Kyte |
| 3,334,687 A | 8/1967 | Parker |
| 3,342,257 A | 9/1967 | Jacobs et al. |
| 3,342,259 A | 9/1967 | Powell |
| 3,347,313 A | 10/1967 | Matthews et al. |
| 3,349,845 A | 10/1967 | Holbert et al. |
| 3,351,132 A | 11/1967 | Dougan et al. |
| 3,361,201 A | 1/1968 | Howard |
| 3,363,686 A | 1/1968 | Gilchrist |
| 3,363,687 A | 1/1968 | Dean |
| 3,373,804 A | 3/1968 | Glass et al. |
| 3,379,246 A | 4/1968 | Skylar et al. |
| 3,379,248 A | 4/1968 | Strange |
| 3,406,755 A | 10/1968 | Sharp |
| 3,411,578 A | 11/1968 | Holmes |
| 3,412,793 A | 11/1968 | Needham |
| 3,412,794 A | 11/1968 | Craighead |
| 3,422,891 A | 1/1969 | Alexander et al. |
| 3,430,700 A | 3/1969 | Satter et al. |
| 3,441,083 A | 4/1969 | Fitzgerald |
| 3,454,095 A | 7/1969 | Messenger et al. |
| 3,454,958 A | 7/1969 | Parker |
| 3,456,721 A | 7/1969 | Smith |
| 3,490,529 A | 1/1970 | Parker |
| 3,490,531 A | 1/1970 | Dixon |
| 3,507,330 A | 4/1970 | Gill |
| 3,547,192 A | 12/1970 | Claridge et al. |
| 3,554,285 A | 1/1971 | Meldau |
| 3,572,436 A | 3/1971 | Riehl |
| 3,605,888 A | 9/1971 | Crowson et al. |
| 3,608,638 A | 9/1971 | Terwiltiger |
| 3,653,438 A | 4/1972 | Wagner |
| 3,685,581 A | 8/1972 | Hess et al. |
| 3,690,376 A | 9/1972 | Zwicky et al. |
| 3,703,927 A | 11/1972 | Harry |
| 3,705,625 A | 12/1972 | Whitten et al. |
| 3,724,043 A | 4/1973 | Eustance |
| 3,727,686 A | 4/1973 | Prates et al. |
| 3,759,328 A | 9/1973 | Ueber et al. |
| 3,768,559 A | 10/1973 | Allen et al. |
| 3,771,598 A | 11/1973 | McBean |
| 3,782,465 A | 1/1974 | Bell et al. |
| 3,782,472 A | 1/1974 | Siess, Jr. |
| 3,796,262 A | 3/1974 | Allen et al. |
| 3,804,169 A | 4/1974 | Closmann |
| 3,805,885 A | 4/1974 | Van Huisen |
| 3,822,747 A | 7/1974 | Maguire, Jr. |
| 3,822,748 A | 7/1974 | Allen et al. |
| 3,823,777 A | 7/1974 | Allen et al. |
| 3,827,495 A | 8/1974 | Reed |
| 3,837,399 A | 9/1974 | Allen et al. |
| 3,837,402 A | 9/1974 | Stringer |
| 3,838,738 A | 10/1974 | Redford et al. |
| 3,847,219 A | 11/1974 | Wang et al. |
| 3,847,224 A | 11/1974 | Allen et al. |
| 3,872,924 A | 3/1975 | Clampitt |
| 3,881,550 A | 5/1975 | Barry |
| 3,882,941 A | 5/1975 | Pelofsky |
| 3,892,270 A | 7/1975 | Lindquist |
| 3,905,422 A | 9/1975 | Woodward |
| 3,913,671 A | 10/1975 | Redford et al. |
| 3,929,190 A | 12/1975 | Chang et al. |
| 3,931,856 A | 1/1976 | Barnes |
| 3,941,192 A | 3/1976 | Carlin et al. |
| 3,945,436 A | 3/1976 | Barry |
| 3,945,679 A | 3/1976 | Clossmann et al. |
| 3,946,809 A | 3/1976 | Hagedorn |
| 3,946,810 A | 3/1976 | Barry |
| 3,954,139 A | 5/1976 | Allen |
| 3,954,141 A * | 5/1976 | Allen ..................... C10G 1/04 166/403 |
| 3,958,636 A | 5/1976 | Perkins |
| 3,964,546 A | 6/1976 | Allen |
| 3,964,547 A | 6/1976 | Hujsak et al. |
| 3,967,853 A | 7/1976 | Closmann et al. |
| 3,978,920 A | 9/1976 | Bandyopadhyay et al. |
| 3,983,939 A | 10/1976 | Brown et al. |
| 3,993,133 A | 11/1976 | Clampitt |
| 3,994,341 A | 11/1976 | Anderson et al. |
| 3,997,004 A | 12/1976 | Wu |
| 3,999,606 A | 12/1976 | Bandyopadhyay et al. |
| 4,003,432 A | 1/1977 | Paull et al. |
| 4,004,636 A | 1/1977 | Brown et al. |
| 4,007,785 A | 2/1977 | Allen et al. |
| 4,007,791 A | 2/1977 | Johnson |
| 4,008,764 A | 2/1977 | Allen |
| 4,008,765 A | 2/1977 | Anderson et al. |
| 4,019,575 A | 4/1977 | Pisio et al. |
| 4,019,578 A | 4/1977 | Terry et al. |
| 4,020,901 A | 5/1977 | Pisio et al. |
| 4,022,275 A | 5/1977 | Brandon |
| 4,022,277 A | 5/1977 | Routson |
| 4,022,279 A | 5/1977 | Driver |
| 4,022,280 A | 5/1977 | Stoddard et al. |
| 4,026,358 A | 5/1977 | Allen |
| 4,033,411 A | 7/1977 | Goins |
| 4,037,655 A | 7/1977 | Carpenter |
| 4,037,658 A | 7/1977 | Anderson |
| 4,049,053 A | 9/1977 | Fisher et al. |
| 4,066,127 A | 1/1978 | Harnsberger |
| 4,067,391 A | 1/1978 | Dewell |
| 4,068,715 A | 1/1978 | Wu |
| 4,068,717 A | 1/1978 | Needham |
| 4,078,608 A | 3/1978 | Allen et al. |
| 4,079,585 A | 3/1978 | Helleur |
| 4,084,637 A | 4/1978 | Todd |
| 4,085,799 A | 4/1978 | Bousaid et al. |
| 4,085,800 A | 4/1978 | Engle et al. |
| 4,085,803 A | 4/1978 | Butler |
| 4,088,188 A | 5/1978 | Widmyer |
| 4,099,564 A | 7/1978 | Hutchinson |
| 4,099,568 A | 7/1978 | Allen |
| 4,109,720 A | 8/1978 | Allen et al. |
| 4,114,687 A | 9/1978 | Payton |
| 4,114,691 A | 9/1978 | Payton |
| 4,116,275 A | 9/1978 | Butler et al. |
| 4,119,149 A | 10/1978 | Wu et al. |
| 4,120,357 A | 10/1978 | Anderson |
| 4,124,071 A | 11/1978 | Allen et al. |

(56) References Cited

U.S. PATENT DOCUMENTS

| | | |
|---|---|---|
| 4,124,074 A | 11/1978 | Allen et al. |
| 4,127,170 A | 11/1978 | Redford |
| 4,129,183 A | 12/1978 | Kalfoglou |
| 4,129,308 A | 12/1978 | Hutchinson |
| 4,130,163 A | 12/1978 | Bombardieri |
| 4,133,382 A | 1/1979 | Cram et al. |
| 4,133,384 A | 1/1979 | Allen et al. |
| 4,140,180 A | 2/1979 | Bridges et al. |
| 4,140,182 A | 2/1979 | Vriend |
| 4,141,415 A | 2/1979 | Wu et al. |
| 4,144,935 A | 3/1979 | Bridges et al. |
| RE30,019 E | 6/1979 | Lindquist |
| 4,160,479 A | 7/1979 | Richardson et al. |
| 4,160,481 A | 7/1979 | Turk et al. |
| 4,166,503 A | 9/1979 | Hall et al. |
| 4,174,752 A | 11/1979 | Slater et al. |
| 4,175,618 A | 11/1979 | Wu et al. |
| 4,191,252 A | 3/1980 | Buckley et al. |
| 4,202,168 A | 5/1980 | Acheson et al. |
| 4,202,169 A | 5/1980 | Acheson et al. |
| 4,207,945 A | 6/1980 | Hall et al. |
| 4,212,353 A | 7/1980 | Hall |
| 4,217,956 A | 8/1980 | Goss et al. |
| 4,223,728 A | 9/1980 | Pegg |
| 4,228,853 A | 10/1980 | Harvey et al. |
| 4,228,854 A | 10/1980 | Sacuta |
| 4,228,856 A | 10/1980 | Reale |
| 4,246,966 A | 1/1981 | Stoddard et al. |
| 4,248,302 A | 2/1981 | Churchman |
| 4,249,602 A | 2/1981 | Burton, III et al. |
| 4,250,964 A | 2/1981 | Jewell et al. |
| 4,252,194 A | 2/1981 | Felber et al. |
| 4,260,018 A | 4/1981 | Shum et al. |
| 4,262,745 A | 4/1981 | Stewart |
| 4,265,310 A | 5/1981 | Britton et al. |
| 4,270,609 A | 6/1981 | Choules |
| 4,271,905 A | 6/1981 | Redford et al. |
| 4,274,487 A | 6/1981 | Hollingsworth et al. |
| 4,280,559 A | 7/1981 | Best |
| 4,282,929 A | 8/1981 | Krajicek |
| 4,284,139 A | 8/1981 | Sweany |
| RE30,738 E | 9/1981 | Bridges et al. |
| 4,289,203 A | 9/1981 | Swanson |
| 4,295,980 A | 10/1981 | Motz |
| 4,296,814 A | 10/1981 | Stalder et al. |
| 4,300,634 A | 11/1981 | Clampitt |
| 4,303,126 A | 12/1981 | Blevins |
| 4,305,463 A | 12/1981 | Zakiewicz |
| 4,306,981 A | 12/1981 | Blair, Jr. |
| 4,319,632 A | 3/1982 | Marr, Jr. |
| 4,319,635 A | 3/1982 | Jones |
| 4,324,291 A | 4/1982 | Wong et al. |
| 4,325,432 A | 4/1982 | Henry |
| 4,326,968 A | 4/1982 | Blair, Jr. |
| 4,327,805 A | 5/1982 | Poston |
| 4,330,038 A | 5/1982 | Soukup et al. |
| 4,333,529 A | 6/1982 | McCorquodale |
| 4,344,483 A | 8/1982 | Fisher et al. |
| 4,344,485 A | 8/1982 | Butler |
| 4,344,486 A | 8/1982 | Parrish |
| 4,345,652 A | 8/1982 | Roque |
| 4,362,213 A | 12/1982 | Tabor |
| 4,372,385 A | 2/1983 | Rhoades et al. |
| 4,372,386 A | 2/1983 | Rhoades et al. |
| 4,379,489 A | 4/1983 | Rollmann |
| 4,379,592 A | 4/1983 | Vakhnin et al. |
| 4,380,265 A | 4/1983 | Mohaupt |
| 4,380,267 A | 4/1983 | Fox |
| 4,381,124 A | 4/1983 | Verty et al. |
| 4,382,469 A | 5/1983 | Bell et al. |
| 4,385,661 A | 5/1983 | Fox |
| 4,387,016 A | 6/1983 | Gagon |
| 4,389,320 A | 6/1983 | Clampitt |
| 4,390,062 A | 6/1983 | Fox |
| 4,390,067 A | 6/1983 | William |
| 4,392,530 A | 7/1983 | Odeh et al. |
| 4,393,937 A | 7/1983 | Dilgren et al. |
| 4,396,063 A | 8/1983 | Godbey |
| 4,398,602 A | 8/1983 | Anderson |
| 4,398,692 A | 8/1983 | Macfie |
| 4,406,499 A | 9/1983 | Yildirim |
| 4,407,367 A | 10/1983 | Kydd |
| 4,410,216 A | 10/1983 | Allen |
| 4,411,618 A | 10/1983 | Donaldson et al. |
| 4,412,585 A | 11/1983 | Bouck |
| 4,415,034 A | 11/1983 | Bouck |
| 4,417,620 A | 11/1983 | Shafir |
| 4,418,752 A | 12/1983 | Boyer et al. |
| 4,423,779 A | 1/1984 | Livingston |
| 4,427,528 A | 1/1984 | Lindörfer et al. |
| 4,429,744 A | 2/1984 | Cook |
| 4,429,745 A | 2/1984 | Cook |
| 4,431,056 A | 2/1984 | Shu |
| 4,434,851 A | 3/1984 | Haynes, Jr. et al. |
| 4,441,555 A | 4/1984 | Shu |
| 4,444,257 A | 4/1984 | Stine |
| 4,444,261 A | 4/1984 | Islip |
| 4,445,573 A | 5/1984 | McCaleb |
| 4,448,251 A | 5/1984 | Stine |
| 4,450,909 A | 5/1984 | Sacuta |
| 4,450,911 A | 5/1984 | Seglin et al. |
| 4,450,913 A | 5/1984 | Allen et al. |
| 4,452,491 A | 6/1984 | Seglin et al. |
| 4,453,597 A | 6/1984 | Brown et al. |
| 4,456,065 A | 6/1984 | Heim et al. |
| 4,456,066 A | 6/1984 | Shu |
| 4,456,068 A | 6/1984 | Burrill, Jr. et al. |
| 4,458,756 A | 7/1984 | Clark |
| 4,458,759 A | 7/1984 | Isaacs et al. |
| 4,460,044 A | 7/1984 | Porter |
| 4,465,137 A | 8/1984 | Sustek, Jr. et al. |
| 4,466,485 A | 8/1984 | Shu |
| 4,469,177 A | 9/1984 | Venkatesan |
| 4,471,839 A | 9/1984 | Snavely et al. |
| 4,473,114 A | 9/1984 | Bell et al. |
| 4,475,592 A | 10/1984 | Pachovsky |
| 4,475,595 A | 10/1984 | Watkins et al. |
| 4,478,280 A | 10/1984 | Hopkins et al. |
| 4,478,705 A | 10/1984 | Ganguli |
| 4,480,689 A | 11/1984 | Wunderlich |
| 4,484,630 A | 11/1984 | Chung |
| 4,485,868 A | 12/1984 | Sresty et al. |
| 4,487,262 A | 12/1984 | Venkatesan et al. |
| 4,487,264 A | 12/1984 | Hyne et al. |
| 4,488,600 A | 12/1984 | Fan |
| 4,488,976 A | 12/1984 | Dilgren et al. |
| 4,491,180 A | 1/1985 | Brown et al. |
| 4,495,994 A | 1/1985 | Brown et al. |
| 4,498,537 A | 2/1985 | Cook |
| 4,498,542 A | 2/1985 | Eisenhawer et al. |
| 4,499,946 A | 2/1985 | Martin et al. |
| 4,501,325 A | 2/1985 | Frazier et al. |
| 4,501,326 A | 2/1985 | Edmunds |
| 4,501,445 A | 2/1985 | Gregoli |
| 4,503,910 A | 3/1985 | Shu |
| 4,503,911 A | 3/1985 | Harman et al. |
| 4,508,170 A | 4/1985 | Littmann |
| 4,513,819 A | 4/1985 | Islip et al. |
| 4,515,215 A | 5/1985 | Hermes et al. |
| 4,516,636 A | 5/1985 | Doscher |
| 4,522,260 A | 6/1985 | Wolcott, Jr. |
| 4,522,263 A | 6/1985 | Hopkins et al. |
| 4,524,826 A | 6/1985 | Savage |
| 4,527,650 A | 7/1985 | Bartholet |
| 4,528,104 A | 7/1985 | House et al. |
| 4,530,401 A | 7/1985 | Hartman et al. |
| 4,532,993 A | 8/1985 | Dilgren et al. |
| 4,532,994 A | 8/1985 | Toma et al. |
| 4,535,845 A | 8/1985 | Brown et al. |
| 4,540,049 A | 9/1985 | Hawkins et al. |
| 4,540,050 A | 9/1985 | Huang et al. |
| 4,545,435 A | 10/1985 | Bridges et al. |
| 4,546,829 A | 10/1985 | Martin et al. |
| 4,550,779 A | 11/1985 | Zakiewicz |

(56) References Cited

U.S. PATENT DOCUMENTS

| | | |
|---|---|---|
| 4,556,107 A | 12/1985 | Duerksen et al. |
| 4,558,740 A | 12/1985 | Yellig, Jr. |
| 4,565,245 A | 1/1986 | Mims et al. |
| 4,565,249 A | 1/1986 | Pebdani et al. |
| 4,572,296 A | 2/1986 | Watkins |
| 4,574,884 A | 3/1986 | Schmidt |
| 4,574,886 A | 3/1986 | Hopkins et al. |
| 4,577,688 A | 3/1986 | Gassmann et al. |
| 4,579,176 A | 4/1986 | Davies et al. |
| 4,589,487 A | 5/1986 | Venkatesan et al. |
| 4,595,057 A | 6/1986 | Deming et al. |
| 4,597,441 A | 7/1986 | Ware et al. |
| 4,597,443 A | 7/1986 | Shu et al. |
| 4,598,770 A | 7/1986 | Shu et al. |
| 4,601,337 A | 7/1986 | Lau et al. |
| 4,601,338 A | 7/1986 | Prats et al. |
| 4,607,695 A | 8/1986 | Weber |
| 4,607,699 A | 8/1986 | Stephens |
| 4,607,700 A | 8/1986 | Duerksen et al. |
| 4,610,304 A | 9/1986 | Doscher |
| 4,612,989 A | 9/1986 | Rakach et al. |
| 4,612,990 A | 9/1986 | Shu |
| 4,615,391 A | 10/1986 | Garthoffner |
| 4,620,592 A | 11/1986 | Perkins |
| 4,620,593 A | 11/1986 | Haagensen |
| 4,635,720 A | 1/1987 | Chew |
| 4,637,461 A | 1/1987 | Hight |
| 4,637,466 A | 1/1987 | Hawkins et al. |
| 4,640,352 A | 2/1987 | Vanmeurs et al. |
| 4,640,359 A | 2/1987 | Livesey et al. |
| 4,641,710 A | 2/1987 | Klinger |
| 4,645,003 A | 2/1987 | Huang et al. |
| 4,645,004 A | 2/1987 | Bridges et al. |
| 4,646,824 A | 3/1987 | Huang et al. |
| 4,648,835 A | 3/1987 | Esienhawer et al. |
| 4,651,825 A | 3/1987 | Wilson |
| 4,651,826 A | 3/1987 | Holmes |
| 4,653,583 A | 3/1987 | Huang et al. |
| 4,662,438 A | 5/1987 | Taflove et al. |
| 4,662,440 A | 5/1987 | Harmon et al. |
| 4,662,441 A | 5/1987 | Huang et al. |
| 4,665,035 A | 5/1987 | Tunac |
| 4,665,989 A | 5/1987 | Wilson |
| 4,667,739 A | 5/1987 | Van Meurs et al. |
| 4,679,626 A | 7/1987 | Perkins |
| 4,682,652 A | 7/1987 | Huang et al. |
| 4,682,653 A | 7/1987 | Angstadt |
| 4,685,515 A | 8/1987 | Huang et al. |
| 4,687,058 A | 8/1987 | Casad et al. |
| 4,690,215 A | 9/1987 | Roberts et al. |
| 4,691,773 A | 9/1987 | Ward et al. |
| 4,694,907 A | 9/1987 | Stahl et al. |
| 4,696,311 A | 9/1987 | Muiis et al. |
| 4,697,642 A | 10/1987 | Vogel |
| 4,699,213 A | 10/1987 | Fleming |
| 4,700,779 A | 10/1987 | Huang et al. |
| 4,702,314 A | 10/1987 | Huang et al. |
| 4,702,317 A | 10/1987 | Shen |
| 4,705,108 A | 11/1987 | Little et al. |
| 4,706,751 A | 11/1987 | Gondouin |
| 4,707,230 A | 11/1987 | Ajami |
| 4,718,485 A | 1/1988 | Brown et al. |
| 4,718,489 A | 1/1988 | Hallam et al. |
| 4,727,489 A | 2/1988 | Frazier et al. |
| 4,727,937 A | 3/1988 | Shum et al. |
| 4,739,831 A | 4/1988 | Settlemeyer et al. |
| 4,753,293 A | 6/1988 | Bohn |
| 4,756,369 A | 7/1988 | Jennings, Jr. et al. |
| 4,757,833 A | 7/1988 | Danley |
| 4,759,571 A | 7/1988 | Stone et al. |
| 4,766,958 A | 8/1988 | Faecke |
| 4,769,161 A | 9/1988 | Angstadt |
| 4,775,450 A | 10/1988 | Ajami |
| 4,782,901 A | 11/1988 | Phelps et al. |
| 4,785,028 A | 11/1988 | Hoskin et al. |
| 4,785,883 A | 11/1988 | Hoskin et al. |
| 4,787,452 A | 11/1988 | Jennings, Jr. |
| 4,793,409 A | 12/1988 | Bridges et al. |
| 4,793,415 A | 12/1988 | Holmes et al. |
| 4,804,043 A | 2/1989 | Shu et al. |
| 4,809,780 A | 3/1989 | Shen |
| 4,813,483 A | 3/1989 | Ziegler |
| 4,817,711 A | 4/1989 | Jeambey |
| 4,817,714 A | 4/1989 | Jones |
| 4,818,370 A | 4/1989 | Gregoli et al. |
| 4,819,724 A | 4/1989 | Bou-Mikael |
| 4,828,030 A | 5/1989 | Jennings, Jr. |
| 4,828,031 A | 5/1989 | Davis |
| 4,828,032 A | 5/1989 | Telezke et al. |
| 4,834,174 A | 5/1989 | Vandevier |
| 4,834,179 A | 5/1989 | Kokolis et al. |
| 4,844,155 A | 7/1989 | Megyeri et al. |
| 4,846,275 A | 7/1989 | McKay |
| 4,850,429 A | 7/1989 | Mims et al. |
| 4,856,587 A | 8/1989 | Nielson |
| 4,856,856 A | 8/1989 | Phelps et al. |
| 4,860,827 A | 8/1989 | Lee et al. |
| 4,861,263 A | 8/1989 | Schirmer |
| 4,867,238 A | 9/1989 | Bayless et al. |
| 4,869,830 A | 9/1989 | Konak et al. |
| 4,874,043 A | 10/1989 | Joseph et al. |
| 4,877,542 A | 10/1989 | Lon et al. |
| 4,884,155 A | 11/1989 | Spash |
| 4,884,635 A | 12/1989 | McKay et al. |
| 4,886,118 A | 12/1989 | Van Meurs et al. |
| 4,892,146 A | 1/1990 | Shen |
| 4,895,085 A | 1/1990 | Chips |
| 4,895,206 A | 1/1990 | Price |
| 4,896,725 A | 1/1990 | Parker et al. |
| 4,901,795 A | 2/1990 | Phelps et al. |
| 4,903,766 A | 2/1990 | Shu |
| 4,903,768 A | 2/1990 | Shu |
| 4,903,770 A | 2/1990 | Friedeman et al. |
| 4,915,170 A | 4/1990 | Hoskin |
| 4,919,206 A | 4/1990 | Freeman et al. |
| 4,926,941 A | 5/1990 | Glandt et al. |
| 4,926,943 A | 5/1990 | Hoskin |
| 4,928,766 A | 5/1990 | Hoskin |
| 4,930,454 A | 6/1990 | Latty et al. |
| 4,940,091 A | 7/1990 | Shu et al. |
| 4,945,984 A | 8/1990 | Price |
| 4,947,933 A | 8/1990 | Jones et al. |
| 4,961,467 A | 10/1990 | Pebdani |
| 4,962,814 A | 10/1990 | Alameddine |
| 4,964,461 A | 10/1990 | Shu |
| 4,966,235 A | 10/1990 | Gregoli et al. |
| 4,969,520 A | 11/1990 | Jan et al. |
| 4,974,677 A | 12/1990 | Shu |
| 4,982,786 A | 1/1991 | Jennings, Jr. |
| 4,983,364 A | 1/1991 | Buck et al. |
| 4,991,652 A | 2/1991 | Hoskin et al. |
| 5,010,953 A | 4/1991 | Friedman et al. |
| 5,013,462 A | 5/1991 | Danley |
| 5,014,787 A | 5/1991 | Duerksen |
| 5,016,709 A | 5/1991 | Combe et al. |
| 5,016,710 A | 5/1991 | Renard et al. |
| 5,016,713 A | 5/1991 | Sanchez et al. |
| 5,024,275 A | 6/1991 | Anderson et al. |
| 5,025,863 A | 6/1991 | Haines |
| 5,027,898 A | 7/1991 | Naae |
| 5,036,915 A | 8/1991 | Wyganowski |
| 5,036,917 A | 8/1991 | Jennings, Jr. et al. |
| 5,036,918 A | 8/1991 | Jennings, Jr. et al. |
| 5,040,605 A | 8/1991 | Showalter |
| 5,042,579 A | 8/1991 | Glandt et al. |
| 5,046,559 A | 9/1991 | Glandt |
| 5,046,560 A | 9/1991 | Teletzke et al. |
| 5,052,482 A | 10/1991 | Gondouin |
| 5,054,551 A | 10/1991 | Duerksen |
| 5,056,596 A | 10/1991 | McKay et al. |
| 5,058,681 A | 10/1991 | Reed |
| 5,060,726 A | 10/1991 | Glandt et al. |
| 5,065,819 A | 11/1991 | Kasevich |
| 5,083,612 A | 1/1992 | Ashrawi |

(56) References Cited

U.S. PATENT DOCUMENTS

| | | |
|---|---|---|
| 5,083,613 A | 1/1992 | Gregoli et al. |
| 5,085,275 A | 2/1992 | Gondouin |
| 5,095,984 A | 3/1992 | Irani |
| 5,099,918 A | 3/1992 | Bridges et al. |
| 5,101,898 A | 4/1992 | Hong |
| 5,105,880 A | 4/1992 | Shen |
| 5,109,927 A | 5/1992 | Supernaw et al. |
| 5,123,485 A | 6/1992 | Vasicek et al. |
| 5,131,471 A | 7/1992 | Duerksen et al. |
| 5,145,002 A | 9/1992 | McKay |
| 5,145,003 A | 9/1992 | Duerksen |
| 5,148,869 A | 9/1992 | Sanchez |
| 5,152,341 A | 10/1992 | Kasevich et al. |
| 5,156,214 A | 10/1992 | Hoskin et al. |
| 5,167,280 A | 12/1992 | Sanchez et al. |
| 5,172,763 A | 12/1992 | Mohammadi et al. |
| 5,174,377 A | 12/1992 | Kumar |
| 5,178,217 A | 1/1993 | Mohammadi et al. |
| 5,186,256 A | 2/1993 | Downs |
| 5,197,541 A | 3/1993 | Hess et al. |
| 5,199,488 A | 4/1993 | Kasevich et al. |
| 5,199,490 A | 4/1993 | Surles et al. |
| 5,201,815 A | 4/1993 | Hong et al. |
| 5,215,146 A | 6/1993 | Sanchez |
| 5,215,149 A | 6/1993 | Lu |
| 5,236,039 A | 8/1993 | Edelstein et al. |
| 5,238,066 A | 8/1993 | Beattie et al. |
| 5,246,071 A | 9/1993 | Chu |
| 5,247,993 A | 9/1993 | Sarem et al. |
| 5,252,226 A | 10/1993 | Justice |
| 5,271,693 A | 12/1993 | Johnson et al. |
| 5,273,111 A | 12/1993 | Brannan et al. |
| 5,277,830 A | 1/1994 | Hoskin et al. |
| 5,279,367 A | 1/1994 | Osterloh |
| 5,282,508 A | 2/1994 | Ellingsen et al. |
| 5,289,881 A | 3/1994 | Schuh |
| 5,293,936 A | 3/1994 | Bridges |
| 5,295,540 A | 3/1994 | Djabbarah et al. |
| 5,297,627 A | 3/1994 | Sanchez et al. |
| 5,305,829 A | 4/1994 | Kumar |
| 5,318,124 A | 6/1994 | Ong et al. |
| 5,325,918 A | 7/1994 | Berryman et al. |
| 5,339,897 A | 8/1994 | Leaute |
| 5,339,898 A | 8/1994 | Yu et al. |
| 5,339,904 A | 8/1994 | Jennings, Jr. et al. |
| 5,350,014 A | 9/1994 | McKay |
| 5,358,054 A | 10/1994 | Bert |
| 5,361,845 A | 11/1994 | Jamaluddin et al. |
| 5,377,757 A | 1/1995 | Ng |
| 5,404,950 A | 4/1995 | Ng et al. |
| 5,407,009 A | 4/1995 | Butler et al. |
| 5,411,086 A | 5/1995 | Burcham et al. |
| 5,411,089 A | 5/1995 | Vinegar et al. |
| 5,411,094 A | 5/1995 | Northrop |
| 5,413,175 A | 5/1995 | Edmunds |
| 5,414,231 A | 5/1995 | Sato et al. |
| 5,417,283 A | 5/1995 | Ejiogu et al. |
| 5,431,224 A | 7/1995 | Laali |
| 5,433,271 A | 7/1995 | Vinegar et al. |
| 5,449,038 A | 9/1995 | Horton et al. |
| 5,450,902 A | 9/1995 | Mathews |
| 5,456,315 A | 10/1995 | Kinsman et al. |
| 5,458,193 A | 10/1995 | Horton et al. |
| 5,483,801 A | 1/1996 | Craze |
| 5,503,226 A | 4/1996 | Wadleigh |
| 5,511,616 A | 4/1996 | Bert |
| 5,513,705 A | 5/1996 | Djabbarah et al. |
| 5,531,272 A | 7/1996 | Ng et al. |
| 5,534,186 A | 7/1996 | Walker et al. |
| 5,542,474 A | 8/1996 | Djabbarah et al. |
| 5,547,022 A | 8/1996 | Juprasert et al. |
| 5,553,974 A | 9/1996 | Nazarian |
| 5,560,737 A | 10/1996 | Schuring et al. |
| 5,565,139 A | 10/1996 | Walker et al. |
| 5,589,775 A | 12/1996 | Kuckes |
| 5,607,016 A | 3/1997 | Butler |
| 5,607,018 A | 3/1997 | Schuh |
| 5,626,191 A | 5/1997 | Greaves et al. |
| 5,626,193 A | 5/1997 | Nzekwu et al. |
| 5,635,139 A | 6/1997 | Holst et al. |
| 5,646,309 A | 7/1997 | Hammarberg et al. |
| 5,650,128 A | 7/1997 | Holst et al. |
| 5,660,500 A | 8/1997 | Marsden, Jr. et al. |
| 5,674,816 A | 10/1997 | Loree |
| 5,677,267 A | 10/1997 | Suarez et al. |
| 5,682,613 A | 11/1997 | Dinatale |
| 5,685,371 A | 11/1997 | Richardson et al. |
| 5,691,906 A | 11/1997 | Togashi et al. |
| 5,709,505 A | 1/1998 | Williams et al. |
| 5,713,415 A | 2/1998 | Bridges |
| 5,720,350 A | 2/1998 | McGuire |
| 5,725,054 A | 3/1998 | Shayegi |
| 5,738,937 A | 4/1998 | Baychar |
| 5,765,964 A | 6/1998 | Calcote et al. |
| 5,771,973 A | 6/1998 | Jensen |
| 5,788,412 A | 8/1998 | Jatkar |
| RE35,891 E | 9/1998 | Jamaluddin et al. |
| 5,803,171 A | 9/1998 | McCaffery et al. |
| 5,803,178 A | 9/1998 | Cain |
| 5,813,799 A | 9/1998 | Calcote et al. |
| 5,823,631 A | 10/1998 | Herbolzheimer et al. |
| 5,826,656 A | 10/1998 | McGuire et al. |
| 5,860,475 A | 1/1999 | Ejiogu et al. |
| 5,899,274 A | 5/1999 | Frauenfeld et al. |
| 5,923,170 A | 7/1999 | Kuckes |
| 5,931,230 A | 8/1999 | Lesage et al. |
| 5,941,081 A | 8/1999 | Burgener |
| 5,957,202 A | 9/1999 | Huang |
| 5,984,010 A | 11/1999 | Elias et al. |
| 6,000,471 A | 12/1999 | Langset |
| 6,004,451 A | 12/1999 | Rock et al. |
| 6,012,520 A | 1/2000 | Yu et al. |
| 6,015,015 A | 1/2000 | Luft et al. |
| 6,016,867 A | 1/2000 | Gregoli et al. |
| 6,016,868 A | 1/2000 | Gregoli et al. |
| 6,026,914 A | 2/2000 | Adams et al. |
| 6,039,116 A | 3/2000 | Stevenson et al. |
| 6,039,121 A | 3/2000 | Kisman |
| 6,048,810 A | 4/2000 | Baychar |
| 6,050,335 A | 4/2000 | Parsons |
| 6,056,057 A | 5/2000 | Vinegar et al. |
| 6,102,122 A | 8/2000 | de Rouffignac |
| 6,109,358 A | 8/2000 | McPhee et al. |
| 6,148,911 A | 11/2000 | Gipson et al. |
| 6,158,510 A | 12/2000 | Bacon et al. |
| 6,158,513 A | 12/2000 | Nistor et al. |
| 6,167,966 B1 | 1/2001 | Ayasse et al. |
| 6,173,775 B1 | 1/2001 | Elias et al. |
| 6,186,232 B1 | 2/2001 | Isaccs et al. |
| 6,189,611 B1 | 2/2001 | Kasevich |
| 6,205,289 B1 | 3/2001 | Kobro |
| 6,230,814 B1 | 5/2001 | Nasr et al. |
| 6,244,341 B1 | 6/2001 | Miller |
| 6,257,334 B1 | 7/2001 | Cyr et al. |
| 6,263,965 B1 | 7/2001 | Schmidt et al. |
| 6,276,457 B1 | 8/2001 | Moffatt et al. |
| 6,285,014 B1 | 9/2001 | Beck et al. |
| 6,305,472 B2 | 10/2001 | Richardson et al. |
| 6,318,464 B1 | 11/2001 | Mokrys |
| 6,325,147 B1 | 12/2001 | Doerler et al. |
| 6,328,104 B1 | 12/2001 | Graue |
| 6,353,706 B1 | 3/2002 | Bridges |
| 6,357,526 B1 | 3/2002 | Abdel-Halim et al. |
| 6,405,799 B1 | 6/2002 | Vallejos et al. |
| 6,409,226 B1 | 6/2002 | Slack et al. |
| 6,412,557 B1 | 7/2002 | Ayasse et al. |
| 6,413,016 B1 | 7/2002 | Nelson et al. |
| 6,454,010 B1 | 9/2002 | Thomas et al. |
| 6,484,805 B1 | 11/2002 | Perkins et al. |
| 6,536,523 B1 | 3/2003 | Kresnyak et al. |
| 6,554,067 B1 | 4/2003 | Davies et al. |
| 6,561,274 B1 | 5/2003 | Hayes et al. |
| 6,581,684 B2 | 6/2003 | Wellington et al. |
| 6,588,500 B2 | 7/2003 | Lewis |

(56) References Cited

U.S. PATENT DOCUMENTS

| | | | |
|---|---|---|---|
| 6,591,908 | B2 | 7/2003 | Nasr |
| 6,607,036 | B2 | 8/2003 | Ranson et al. |
| 6,631,761 | B2 | 10/2003 | Yuan et al. |
| 6,662,872 | B2 | 12/2003 | Gutek et al. |
| 6,666,666 | B1 | 12/2003 | Gilbert et al. |
| 6,681,859 | B2 | 1/2004 | Hill |
| 6,688,387 | B1 | 2/2004 | Wellington et al. |
| 6,702,016 | B2 | 3/2004 | de Rouffignac et al. |
| 6,708,759 | B2 | 3/2004 | Leaute et al. |
| 6,712,136 | B2 | 3/2004 | de Rouffignac et al. |
| 6,712,150 | B1 | 3/2004 | Misselbrook et al. |
| 6,715,546 | B2 | 4/2004 | Vinegar et al. |
| 6,715,547 | B2 | 4/2004 | Vinegar et al. |
| 6,715,548 | B2 | 4/2004 | Wellington et al. |
| 6,715,549 | B2 | 4/2004 | Wellington et al. |
| 6,719,047 | B2 | 4/2004 | Fowler et al. |
| 6,722,429 | B2 | 4/2004 | de Rouffignac et al. |
| 6,722,431 | B2 | 4/2004 | Karanikas et al. |
| 6,725,920 | B2 | 4/2004 | Zhang et al. |
| 6,729,394 | B1 | 5/2004 | Hassan et al. |
| 6,729,395 | B2 | 5/2004 | Shahin, Jr. et al. |
| 6,729,397 | B2 | 5/2004 | Zhang et al. |
| 6,729,401 | B2 | 5/2004 | Vinegar et al. |
| 6,732,794 | B2 | 5/2004 | Wellington et al. |
| 6,732,795 | B2 | 5/2004 | de Rouffignac et al. |
| 6,732,796 | B2 | 5/2004 | Vinegar et al. |
| 6,733,636 | B1 | 5/2004 | Heins |
| 6,736,215 | B2 | 5/2004 | Maher et al. |
| 6,736,222 | B2 | 5/2004 | Kuckes et al. |
| 6,739,394 | B2 | 5/2004 | Vinegar et al. |
| 6,742,588 | B2 | 6/2004 | Wellington et al. |
| 6,742,593 | B2 | 6/2004 | Vinegar et al. |
| 6,745,831 | B2 | 6/2004 | de Rouffignac et al. |
| 6,745,832 | B2 | 6/2004 | Wellington et al. |
| 6,745,837 | B2 | 6/2004 | Wellington et al. |
| 6,755,246 | B2 | 6/2004 | Chen et al. |
| 6,758,268 | B2 | 7/2004 | Vinegar et al. |
| 6,769,486 | B2 | 8/2004 | Lim et al. |
| 6,782,947 | B2 | 8/2004 | de Rouffignac et al. |
| 6,789,625 | B2 | 9/2004 | de Rouffignac et al. |
| 6,794,864 | B2 | 9/2004 | Mirotchnik et al. |
| 6,805,195 | B2 | 10/2004 | Vinegar et al. |
| 6,814,141 | B2 | 11/2004 | Huh et al. |
| 6,877,556 | B2 | 4/2005 | Wittle et al. |
| 6,883,607 | B2 | 4/2005 | Nenniger et al. |
| 6,962,466 | B2 | 11/2005 | Vinegar et al. |
| 7,013,970 | B2 | 3/2006 | Collie et al. |
| 7,056,725 | B1 | 6/2006 | Lu |
| 7,069,990 | B1 | 7/2006 | Bilak |
| 7,272,973 | B2 | 9/2007 | Craig |
| 7,294,156 | B2 | 11/2007 | Chakrabarty et al. |
| 7,322,409 | B2 | 1/2008 | Wittle et al. |
| 7,363,973 | B2 | 4/2008 | Nenniger et al. |
| 7,434,619 | B2 | 10/2008 | Rossi et al. |
| 7,464,756 | B2 | 12/2008 | Gates et al. |
| 7,527,096 | B2 | 5/2009 | Chung et al. |
| 7,770,643 | B2 | 8/2010 | Daussin |
| 7,918,269 | B2 | 4/2011 | Cavender et al. |
| 7,975,763 | B2 | 7/2011 | Banerjee et al. |
| 8,141,636 | B2 | 3/2012 | Speirs et al. |
| 8,176,982 | B2 | 5/2012 | Gil et al. |
| 8,215,392 | B2 | 7/2012 | Rao |
| 8,256,511 | B2 | 9/2012 | Boone et al. |
| 8,327,936 | B2 | 12/2012 | Coskuner |
| 8,434,551 | B2 | 5/2013 | Nenniger et al. |
| 8,455,405 | B2 * | 6/2013 | Chakrabarty ............ C10G 1/04 252/364 |
| 8,474,531 | B2 | 7/2013 | Nasr et al. |
| 8,528,642 | B2 | 9/2013 | Boone |
| 8,596,357 | B2 | 12/2013 | Nenniger |
| 8,602,098 | B2 * | 12/2013 | Kwan .................... E21B 43/16 166/250.01 |
| 8,616,278 | B2 | 12/2013 | Boone et al. |
| 8,684,079 | B2 | 4/2014 | Wattenbarger et al. |
| 8,752,623 | B2 | 6/2014 | Sirota et al. |
| 8,770,289 | B2 | 7/2014 | Boone |
| 8,776,900 | B2 | 7/2014 | Nenniger et al. |
| 8,783,358 | B2 | 7/2014 | Critsinelis et al. |
| 8,844,639 | B2 | 9/2014 | Gupta et al. |
| 8,857,512 | B2 | 10/2014 | Nenniger et al. |
| 8,899,321 | B2 | 12/2014 | Dawson et al. |
| 8,985,205 | B2 | 3/2015 | Nenniger |
| 9,103,205 | B2 | 8/2015 | Wright et al. |
| 9,115,577 | B2 | 8/2015 | Alvestad et al. |
| 9,316,096 | B2 | 4/2016 | Bang et al. |
| 9,341,049 | B2 | 5/2016 | Hailey, Jr. et al. |
| 9,347,312 | B2 | 5/2016 | Vincelette et al. |
| 9,359,868 | B2 | 6/2016 | Scott |
| 9,394,769 | B2 | 7/2016 | Nenniger |
| 9,488,040 | B2 | 11/2016 | Chakrabarty et al. |
| 9,506,332 | B2 | 11/2016 | Saeedfar |
| 9,644,467 | B2 | 5/2017 | Chakrabarty |
| 9,739,123 | B2 | 8/2017 | Wheeler et al. |
| 9,809,786 | B2 | 11/2017 | Olson et al. |
| 9,845,669 | B2 | 12/2017 | Miller et al. |
| 9,951,595 | B2 | 4/2018 | Akinlade et al. |
| 9,970,282 | B2 | 5/2018 | Khaledi et al. |
| 9,970,283 | B2 | 5/2018 | Khaledi et al. |
| 10,000,998 | B2 | 6/2018 | Chakrabarty et al. |
| 10,041,340 | B2 | 8/2018 | Chakrabarty |
| 10,094,208 | B2 | 10/2018 | Hoier et al. |
| 10,145,226 | B2 | 12/2018 | Yee et al. |
| 2001/0009830 | A1 | 7/2001 | Bachar |
| 2001/0017206 | A1 | 8/2001 | Davidson et al. |
| 2001/0018975 | A1 | 9/2001 | Richardson et al. |
| 2002/0029881 | A1 | 3/2002 | de Rouffignac et al. |
| 2002/0033253 | A1 | 3/2002 | de Rouffignac et al. |
| 2002/0038710 | A1 | 4/2002 | Maher et al. |
| 2002/0040779 | A1 | 4/2002 | Wellington et al. |
| 2002/0046838 | A1 | 4/2002 | Karanikas et al. |
| 2002/0056551 | A1 | 5/2002 | Wellington et al. |
| 2002/0104651 | A1 | 8/2002 | McClung, III |
| 2002/0148608 | A1 | 10/2002 | Shaw |
| 2002/0157831 | A1 | 10/2002 | Kurlenya et al. |
| 2003/0000711 | A1 | 1/2003 | Gutek et al. |
| 2003/0009297 | A1 | 1/2003 | Mirotchnik et al. |
| 2006/0231455 | A1 | 10/2006 | Olsvik et al. |
| 2008/0115945 | A1 | 5/2008 | Lau et al. |
| 2008/0153717 | A1 | 6/2008 | Pomerleau et al. |
| 2008/0173447 | A1 | 7/2008 | Da Silva et al. |
| 2009/0288826 | A1 | 11/2009 | Gray |
| 2010/0258308 | A1 | 10/2010 | Speirs et al. |
| 2010/0276140 | A1 | 11/2010 | Edmunds et al. |
| 2010/0276341 | A1 | 11/2010 | Speirs et al. |
| 2010/0276983 | A1 | 11/2010 | Dunn et al. |
| 2010/0282593 | A1 | 11/2010 | Speirs et al. |
| 2011/0229071 | A1 | 9/2011 | Vincelette et al. |
| 2011/0272152 | A1 | 11/2011 | Kaminsky et al. |
| 2011/0272153 | A1 | 11/2011 | Boone et al. |
| 2011/0276140 | A1 | 11/2011 | Vresilovic et al. |
| 2011/0303423 | A1 | 12/2011 | Kaminsky et al. |
| 2012/0234535 | A1 | 9/2012 | Dawson et al. |
| 2012/0285700 | A1 | 11/2012 | Scott |
| 2013/0000896 | A1 | 1/2013 | Boone |
| 2013/0000898 | A1 | 1/2013 | Boone |
| 2013/0025861 | A1 | 1/2013 | Kift et al. |
| 2013/0043025 | A1 | 2/2013 | Scott |
| 2013/0045902 | A1 | 2/2013 | Thompson et al. |
| 2013/0098607 | A1 | 4/2013 | Kerr |
| 2013/0105147 | A1 | 5/2013 | Scott |
| 2013/0112408 | A1 | 5/2013 | Oxtoby |
| 2013/0153215 | A1 | 6/2013 | Scott et al. |
| 2013/0153216 | A1 | 6/2013 | Scott |
| 2013/0199777 | A1 | 8/2013 | Scott |
| 2013/0199779 | A1 | 8/2013 | Scott |
| 2013/0199780 | A1 | 8/2013 | Scott |
| 2013/0206405 | A1 | 8/2013 | Kift et al. |
| 2013/0328692 | A1 | 12/2013 | Johannessen |
| 2014/0034305 | A1 | 2/2014 | Dawson |
| 2014/0048259 | A1 | 2/2014 | Menard |
| 2014/0054028 | A1 | 2/2014 | Little et al. |
| 2014/0069641 | A1 | 3/2014 | Kosik |
| 2014/0083694 | A1 | 3/2014 | Scott et al. |
| 2014/0083706 | A1 | 3/2014 | Scott et al. |

(56) References Cited

U.S. PATENT DOCUMENTS

| | | |
|---|---|---|
| 2014/0096959 A1 | 4/2014 | Hocking |
| 2014/0144627 A1 | 5/2014 | Salazar Hernandez et al. |
| 2014/0174744 A1 | 6/2014 | Boone et al. |
| 2014/0251596 A1 | 9/2014 | Gittins et al. |
| 2015/0034555 A1 | 2/2015 | Speirs et al. |
| 2015/0053401 A1 | 2/2015 | Khaledi et al. |
| 2015/0083413 A1 | 3/2015 | Salazar et al. |
| 2015/0107833 A1 | 4/2015 | Boone et al. |
| 2015/0107834 A1 | 4/2015 | Shen et al. |
| 2015/0144345 A1 | 5/2015 | Bilozir et al. |
| 2016/0061014 A1 | 3/2016 | Sood et al. |
| 2016/0153270 A1 | 6/2016 | Chen et al. |
| 2017/0051597 A1 | 2/2017 | Akiya et al. |
| 2017/0130572 A1 | 5/2017 | Yuan et al. |
| 2017/0210972 A1 | 7/2017 | Williamson et al. |
| 2017/0241250 A1 | 8/2017 | Singh et al. |
| 2018/0030381 A1 | 2/2018 | Olson et al. |
| 2018/0073337 A1 | 3/2018 | Park et al. |
| 2018/0265768 A1 | 9/2018 | Williamson |
| 2019/0002755 A1 | 1/2019 | Wang et al. |
| 2019/0032460 A1 | 1/2019 | Khaledi et al. |
| 2019/0032462 A1 | 1/2019 | Motahhari et al. |
| 2019/0063199 A1 | 2/2019 | Doraiswamy et al. |
| 2019/0119577 A1 | 4/2019 | Witham et al. |
| 2019/0120043 A1 | 4/2019 | Gupta et al. |

FOREIGN PATENT DOCUMENTS

| | | |
|---|---|---|
| CA | 0852003 A | 9/1970 |
| CA | 0956885 A | 10/1974 |
| CA | 0977675 A | 11/1975 |
| CA | 1015656 A | 8/1977 |
| CA | 1027851 A | 3/1978 |
| CA | 1059432 A | 7/1979 |
| CA | 1061713 A | 9/1979 |
| CA | 1072442 A | 2/1980 |
| CA | 1295118 C | 2/1992 |
| CA | 1300000 C | 5/1992 |
| CA | 2108723 A1 | 4/1995 |
| CA | 2108349 C | 8/1996 |
| CA | 2349234 | 11/2002 |
| CA | 2369244 C | 4/2005 |
| CA | 2147079 C | 10/2006 |
| CA | 2235085 C | 1/2007 |
| CA | 2281276 C | 2/2007 |
| CA | 2647973 A1 | 10/2007 |
| CA | 2304938 C | 2/2008 |
| CA | 2299790 C | 7/2008 |
| CA | 2633061 A1 | 7/2008 |
| CA | 2374115 C | 5/2010 |
| CA | 2652930 A1 | 7/2010 |
| CA | 2621991 C | 9/2010 |
| CA | 2660227 A1 | 9/2010 |
| CA | 2730875 A1 | 8/2012 |
| CA | 2734170 | 9/2012 |
| CA | 2971941 A1 | 12/2012 |
| CA | 2436158 C | 6/2013 |
| CA | 2553297 C | 7/2013 |
| CA | 2654848 C | 10/2013 |
| CA | 2777966 A1 | 11/2013 |
| CA | 2781273 | 12/2013 |
| CA | 2781273 C | 5/2014 |
| CA | 2804521 A1 | 7/2014 |
| CA | 2917260 A1 | 1/2015 |
| CA | 2917263 A1 | 1/2015 |
| CA | 2841520 A1 | 2/2015 |
| CA | 2785871 C | 5/2015 |
| CA | 2691399 C | 9/2015 |
| CA | 2847759 A1 | 9/2015 |
| CA | 2900178 | 10/2015 |
| CA | 2900179 | 10/2015 |
| CA | 2893170 A1 | 11/2015 |
| CA | 2853445 A1 | 12/2015 |
| CA | 2854171 A1 | 12/2015 |
| CA | 2898065 A1 | 1/2016 |
| CA | 2962274 A1 | 1/2016 |
| CA | 2890491 A1 | 2/2016 |
| CA | 2893221 C | 4/2016 |
| CA | 2872120 A1 | 5/2016 |
| CA | 2875846 C | 5/2016 |
| CA | 2900179 C | 5/2016 |
| CA | 2898943 C | 6/2016 |
| CA | 2897785 C | 7/2016 |
| CA | 2900178 C | 9/2016 |
| CA | 2707776 C | 11/2016 |
| CA | 2893552 C | 11/2016 |
| CA | 2935652 A1 | 1/2017 |
| CA | 2857329 C | 2/2017 |
| CA | 2915571 C | 2/2017 |
| CA | 2856460 C | 5/2017 |
| CA | 2956771 A1 | 8/2017 |
| CA | 2981619 A1 | 12/2017 |
| CA | 2875848 C | 5/2018 |
| CA | 2899805 C | 5/2018 |
| CA | 2928044 C | 7/2018 |
| CA | 2974714 C | 9/2018 |
| CA | 2965117 A1 | 10/2018 |
| CA | 2958715 C | 3/2019 |
| CN | 101870894 | 4/2009 |
| EP | 0144203 A2 | 6/1985 |
| EP | 0261793 A1 | 3/1988 |
| EP | 0283602 A1 | 9/1988 |
| EP | 0747142 B1 | 4/2001 |
| FR | 2852713 | 9/2004 |
| GB | 1457696 A | 12/1976 |
| GB | 1463444 A | 2/1977 |
| GB | 2156400 A | 10/1985 |
| GB | 2164978 A | 4/1986 |
| GB | 2286001 B | 10/1995 |
| GB | 2357528 A | 6/2001 |
| GB | 2391890 A | 2/2004 |
| GB | 2391891 A | 2/2004 |
| GB | 2403443 A | 1/2005 |
| KR | 20130134846 | 5/2012 |
| WO | 1982/01214 A1 | 4/1982 |
| WO | 1989/12728 A1 | 12/1989 |
| WO | 1994/21889 A3 | 9/1994 |
| WO | 1999/67503 A1 | 12/1999 |
| WO | 2000/25002 A1 | 5/2000 |
| WO | 2000/66882 A1 | 11/2000 |
| WO | 2001/81239 A2 | 11/2001 |
| WO | 2001/81715 A2 | 11/2001 |
| WO | 2001/92673 A2 | 12/2001 |
| WO | 2001/92768 A2 | 12/2001 |
| WO | 2002/086018 A2 | 10/2002 |
| WO | 2002/086276 A2 | 10/2002 |
| WO | 2003/010415 A1 | 2/2003 |
| WO | 2003/036033 A1 | 5/2003 |
| WO | 2003/036038 A2 | 5/2003 |
| WO | 2003/036039 A1 | 5/2003 |
| WO | 2003/036043 A2 | 5/2003 |
| WO | 2003/038233 A1 | 5/2003 |
| WO | 2003/040513 A2 | 5/2003 |
| WO | 2003/062596 A1 | 7/2003 |
| WO | 2004/038173 A1 | 5/2004 |
| WO | 2004/038174 A2 | 5/2004 |
| WO | 2004/038175 A1 | 5/2004 |
| WO | 2004/050567 A1 | 6/2004 |
| WO | 2004/050791 A1 | 6/2004 |
| WO | 2004/097159 A3 | 11/2004 |
| WO | 2005/012688 A1 | 2/2005 |
| WO | WO-2014003941 A1 * | 1/2014 |
| WO | 2015/158371 A1 | 10/2015 |
| WO | 2017/222929 A1 | 12/2017 |

OTHER PUBLICATIONS

Lim, G. B., (1995) "Cyclic Stimulation of Cold Lake Oil Sand with Supercritical Ethane," SPE Paper 30298, pp. 521-528.

Ai-Gosayier, M., et al. (2015) "In Situ Recovery of Heavy-Oil From Fractured Carbonate Reservoirs: Optimization of Steam-Over-Solvent Injection Method" *Journal of Petroleum Science and Engineering*, vol. 130, pp. 77-85.

(56) References Cited

OTHER PUBLICATIONS

Andrade, M.R., et al. (2007), "Mixotrophic cultivation of microalga Spirulina platensis using molasses as organic substrate", *Aquaculture*, vol. 264, pp. 130-134.
Bayestehparvin, B., et al. (2015) "Dissolution an dMobilization of Bitumen at Pore Scale", *SPE174482-MS, Prepared for presentation at the SPE Canada Heavy Oil Technical Conference* held in Calgary, Alberta, Canada, Jun. 9-11, 2015; 23 pages.
Butler, R. M. et al. (1991) "A new process (VAPEX) for recovering heavy oils using hot water and hydrocarbon vapour", *CIM/SPE Annual Technical Conference* Jan.-Feb. vol. 30, No. 1, pp. 97-106.
Butler, R. M. et al. (1993) "Recovery of Heavy Oils Using Vapourized Hydrocarbon Solvents: Further Development of the Vapex Process" *The Journal of Canadian Petroleum Technology*, Jun., vol. 32, No. 6, pp. 56-64.
Castanier, L.M., et al. (2005) "Heavy oil upgrading in-situ via solvent injection and combustion: A "new" method", *EAGE 67th Conference & Exhibition*—Madrid, Spain, Jun. 13-16, 2005; 4 pages.
Cristofari, J., et al. (2008) "Laboratory Investigation of the Effect of Solvent Injection on In-Situ Combustion" *SPE 99752* prepared for presentation at the 2006 SPE/DOE Symposium on Improved Oil Recovery, Tulsa, Apr. 22-26. 11 pages.
Cunha, L.B. (2005) "Recent In-Situ Oil Recovery-Technologies for Heavy- and Extraheavy-Oil Reserves", *SPE 94986*, prepared for presentation at the 2005 SPE Latin American and Caribbean Petroleum Enginerring Conference held in Rio de Janeiro, Brazil, Jun. 20-23; 5 pages.
Deng, X (2005) "Recovery Performance and Economics of Steam/Propane Hybrid Process." SPE/PS-CIM/CHOA 97760, PS2005-341, SPE/PS-CIM/CHOA International Thermal Operations and Heavy Oil Symposium, copyright, pp. 1-7.
Diaz, J. A. D. (2006) "An Experimental Study of Steam and Steam-Propane Injection Using a Novel Smart Horizontal Producer to Enhance Oil Production in the San Ardo Field." Presentation given at Sponsor's Meeting, Crisman Institute, Aug. 3, Department of Petroleum Engineering, Texas A&M University (7 pages).
Doan, Q., et al. (2011) "Potential Pitfalls From Successful History—Match Simulation of a Long-Running Clearwater-Fm Sagd Well Pair" *SPE 147318*, Prepared for presentation at the SPE Annual Technical Conference and Exhibition held in Denver, Colorado, Oct. 30-Nov. 2; 9 pages.
D'Silva, J, et al. (2008) "In-Situ Combustion With Solvent Injection" *SPE 117684*, Prepared for presentation at the SPE International Thermal Operations and Heavy Oil Symposium held in Calgary, Alberta, Canada, Oct. 20-23; 11 pages.
D'Silva, J., et al. (2011) "Integration of In-Situ Combustion With Solvent Injection—A Detailed Study" *SPE 141570*, Prepared for presentation at the SPE Projects and Facilities Challenges Conference at METS held in Doha, Qatar, Feb. 13-16; 11 pages.
Dunn-Norman, S., et al. (2002) "Recovery Methods for Heavy Oil in Ultra-Shallow Reservoirs" *SPE 76710*, prepared for presentation at the SPE Western Regional/AAPG Pacific Section Joint Meeting held in Anchorage, Alaska, May 20-22, 6 pages.
Frauenfeld, T.W., et al (2006) "Economic Analysis of Thermal Solvent Processes" *Pet-Soc 2006-164*; Presented at the Petroleum Socity's 7th Canadian International Peteroleum Conference (57th Annual Technical Meeting), Calgary, Alberta, Canada, Jun. 13-15, 2006; 9 pages.
Gates, I.D., et al. (2011) "Evolution of In Situ Oil Sands Recovery Technology: What Happened and What's New?" *SPE150686*, Prepared for presentation at the SPE Heavy Oil Conference and Exhibition held in Kuwait City, Kuwait, Dec. 12-14, 2011; 10 pages.
Ghoodjani, E., et al. (2012) "A Review on Thermal Enhanced Heavy Oil Recovery From Fractured Carbonate Reservoirs" *SPE 150147*, Prepared for presentation at the SPE Heavy Oil Conference Canada held in Calgary, Alberta, Canada, Jun. 12-14, 2012; 8 pages.
Goldthorpe, S. (2013) "Cement Plant CO2 to DME," *IEAGHG Information Paper*; 2013-IP9, Jun. 2013, 1 page.
Greaser, G.R., et al. (2003) "New Thermal Recovery Tech nology and Technology Transfer for Successful Heavy Oil Development." *SPE69731, Society of Petroleum Engineers*, Inc., 7 pages.
Hong, K.C. (1999) "Recent Advances in Steamflood Technology." SPE 54078, Copyright 1999, Society of Petroleum Engineers, Inc., 14 pages.
Jaiswal, N. J. (2006) "Experimental and Analytical Studies of Hydrocarbon Yields Under Dry-, Steam-, and Steam with Propane-Distillation." Presentation given at Crisman Institute's Halliburton Center for Unconventional Resources, Aug. 3, 2006, Department of Petroleum Engineering, Texas A&M University (5 pages).
Jiang, Q., et al. (2010) "Evaluation of Recovery Technologies for the Grosmont Carbonate Reservoirs" *Journal of Canadian Petroleum Technology*, vol. 49, No. 5, pp. 56-64.
Kamal, C., et al. (2012), "Spirulina platensis—A novel green inhibitor for acid corrosion of mild steel", *Arabian Journal of Chemistry*, vol. 5, pp. 155-161.
Khaledi, R., et al. (2018) "Azeotropic Heated Vapour Extraction—A New Thermal-Solvent Assisted Gravity Drainage Recovery Process", *SPE189755-MS*, SPE Canada Heavy Oil Technical Conference held in Calgary, Alberta, Canada, Mar. 13-14, 2018, 20 pages.
Lei, H., et al. (2012) "An Evaluation of Air Injection as a Follow-Up Process to Cyclic Steam Stimulation in a Heavy Oil Reservoir" *SPE 150703*, Prepared for presentation at the SPE Heavy Oil Conference Canada held in Calgary, Alberta, Canada, Jun. 12-14, 2012; 13 pages.
Lennox, T.R. et al (1980) "Geology of In Situ Pilot Project, Wabasca Oil Sands Deposit, Alberta" *Saskatchewan Geological Society Special Publication No. 5*; Conference and Core Seminar, Regina, Oct. 15-17, 1980; pp. 267-268.
Lim, G.B. et al. (1994) "Three Dimensional Scaled Physcial Modeling of Solvent Vapour Extraction of Cold Lake Bitumen," *Canadian SPE Int'l Conf. on Recent Advances in Horizontal Well Applications*, Paper No. HWC94-46, Calgary, Canada, Mar. 20-23, 1994, 11 pages.
Lim, G.B. et al. (1995) "Cyclic Stimulation of Cold Lake Oil Sand with Supercriticall Ethane," *SPE #30298*, Int'l Heavy Oil Symposium, Calgary, Alberta, Canada, Jun. 19-21, 1995, pp. 521-528.
Lyubovsky, M., et al. (2005) "Catalytic Partial 'Oxidation of Methane to Syngas' at Elevated Pressures," *Catalysis Letters*, v. 99, Nos. 3-4, Feb. 2005, pp. 113-117.
Mamora, D. D., (2006) "Thermal Oil Recovery Research at Texas A&M in the Past Five Years—an Overview." Presentation given at the Crisman Institute Halliburton Center for Unconventional Resources, Research Meeting Aug. 3, Department of Petroleum Engineering, Texas A&M University (13 pages).
Mert, B.D., et al. (2011) "The role of Spirulina platensis on corrosion behavior of carbon steel", *Materials Chemistry and Physics*, vol. 130, pp. 697-701.
Mokrys, I. J., et al. (1993) "In-Situ Upgrading of Heavy Oils andBitumen by Propane Deasphalting: The Vapex Process" SPE 25452, Mar. 21-23, Oklahoma City, OK, pp. 409-424.
Mulac, A.J.,et al. (1981) "Project Deep Steam Preliminary Field Test Bakersfield, California." SAND80-2843, Printed Apr. 62 pages.
Naderi, K., et al. (2015) "Effect of Bitumen Viscosity and Bitumen—Water Interfacial Tension on Steam Assisted Bitumen Recovery Process Efficiency", *Journal of Petroleum Science and Engineering* 133, pp. 862-868.
Nasr, T.N., et al. (2005) "Thermal Techniques for the Recovery of Heavy Oil and Bitumen" *SPE 97488* prepared for presentation at the SPE International Improved Oil Recovery Conferencein Asia Pacific held in Kuala Lumpur, Malaysia, Dec. 5-6, 2005. 15 pages.
Nasr, T.N. et al. (2006) "New Hybrid Steam-Solvent Processes for the Recovery of Heavy Oil and Bitumen" *SPE 101717* Prepared for presentation at the Abu Dhabi International Petroleum Exhibition and Conference held in Abu Dhabi, U.A.E., Nov. 5-8, 2006; 17 pages.
National Energy Board, (2004) "Canada's Oil Sands. Opportunities and Challenges to 2015." An Energy Market Assessment, May (158 pages).

(56) References Cited

OTHER PUBLICATIONS

Nexant, Inc. (2008), "Dimethyl Ether Technology and Markets," CHEMSystems PERP Program Report 07/08S3, Dec. 2008, 7 pages.

NTIS, Downhole Steam-Generator Study, vol. 1, Conception and Feasibility Evaluation. Final Report, Sep. 1978-Sep. 1980, Sandia National Labs, Albuquerque NM, Jun. 1982. 260 pages.

Oceaneering; Website: http://www.oceaneering.com/Brochures/MFV%20%Oceaneering%20Multiflex.pdf, Oceaneering Multiflex, Oceaneering International, Incorporated, printed Nov. 23, 2005, 2 pages.

Qi, G.X. et al. (2001) "DME Synthesis from Carbon Dioxide and Hydrogen Over Cu—Mo/HZSM-5," *Catalysis Letters*, V. 72, Nos. 1-2, 2001, pp. 121-124.

Redford, et al. (1980) "Hydrocarbon-Steam Processes for Recovery of Bitumen from Oil Sands" *SPE8823*, Prepared for presentation at the First Joint SPE/DOE Symposium on Enhanced Oil Recovery at Tulsa, Oklahoma, Apr. 20-23; 12 pages.

Saeedfar, A., et al. (2018) "Critical Consideration for Analysis of RF-Thermal Recovery of Heavy Petroleum" *SPE-189714-MS*, Prepared for presentation at the SPE Canada Heavy Oil Technical Conference held in Calgary, Alberta, Canada, Mar. 13-14, 2018; 13 pages.

Seibert, B. H. (2012) "Sonic Azeotropic Gravity Extraction of Heavy Oil From Oil Sands", SPE157849-MS, SPE Heavy Oil Conference Canda held in Calgary, Alberta, Canada, Jun. 12-14, 2012, 10 pages.

Sharma, J. et al. (2010) "Steam-Solvent Coupling at the Chamber Edge in an In Situ Bitumen Recovery Process" *SPE 128045*, Prepared for presentation at the SPE Oil and Gas India Conference and Exhibition held in Mumbai, India Jan. 20-22; 26 pages.

Stark, S.D. (2013) "Cold Lake Commercialization of the Liquid Addition to Steam for Enhancing Recovery (Laser) Process" *IPTC 16795*, Prepared for presentation at the International Petroleum Technology Conference held in Beijing, China, Mar. 26-28, 2013, 15 pages.

Wan Nik, W.B., et al. (2012), "Marine Extracts as Corrosion Inhibitor for Aluminum in Seawater Applications", *International Journal of Engineering Research and Applications* (IJERA), vol. 2, Issue 1; pp. 455-458.

Zhang, L. et al. (2013) "Dehydration of Methanol to Dimethyl Ether Over y-AL2O3 Catalyst: Intrinsic Kinetics and Effectiveness Factor," *Canadian Journal of Chem. Engineering*, v.91, Sep. 2013, pp. 1538-1546.

International Search Report and the Written Opinion of the International Searching Authority, or the Declaration (2 pages), International Search Report (4 pages), and Written Opinion of the International Searching Authority (6 pages) for International Application No. PCT/US2007/080985 dated Feb. 28, 2008.

International Preliminary Report on Patentability (2 pages); Written Opinion of the International Searching Authority (6 pages); all dated Apr. 23, 2009 in PCT International Application No. PCT/US2007/080985 filed Oct. 10, 2007 (Total 8 pages).

Hansen, C. M., et al. (1971) "Encyclopedia of Chemical Technology" First Suppl. vol., pp. 889-910.

Hansen, C. (1999) "Hansen Solubility Parameters A User's Handbook", pp. ii-iv, 1-74 and 151-175.

Feali, M., et al. (2008) "Feasibility Study of the Cyclic VAPEX Process for Low Permeable Carbonate Systems", International Petroleum Technology Conference paper 12833, pp. 1-5.

* cited by examiner

CHASING SOLVENT FOR ENHANCED RECOVERY PROCESSES

CROSS-REFERENCE TO RELATED APPLICATION

This application claims priority from Canadian Patent Application 2,972,203 filed Jun. 29, 2017 entitled CHASING SOLVENT FOR ENHANCED RECOVERY PROCESSES.

BACKGROUND

Field of Disclosure

The present disclosure relates generally to the recovery of hydrocarbons. More specifically, the disclosure relates to methods for optimizing solvent use and reducing the solvent volume used per unit of hydrocarbon production in solvent-dominated processes for recovering bitumen and heavy oil from underground reservoirs.

Description of Related Art

This section is intended to introduce various aspects of the art that may be associated with the present disclosure. This discussion aims to provide a framework to facilitate a better understanding of particular aspects of the present disclosure. Accordingly, it should be understood that this section should be read in this light, and not necessarily as an admission of prior art.

Modern society is greatly dependent on the use of hydrocarbon resources for fuels and chemical feedstock. Hydrocarbons are generally found in subsurface formations that can be termed "reservoirs." Removing hydrocarbons from the reservoirs depends on numerous physical properties of the subsurface formations, such as the permeability of the rock containing the hydrocarbons, the ability of the hydrocarbons to flow through the subsurface formations, and the proportion of hydrocarbons present, among other things. Easily harvested sources of hydrocarbons are dwindling, leaving less accessible sources to satisfy future energy needs. As the prices of hydrocarbons increase, the less accessible sources become more economically attractive.

Recently, the harvesting of oil sands to remove heavy oil has become more economical. Hydrocarbon removal from oil sands may be performed by several techniques. For example, a well can be drilled in an oil sand reservoir and steam, hot gas, solvents, or a combination thereof, can be injected to release the hydrocarbons. The released hydrocarbons may be collected by wells and brought to the surface.

At the present time, solvent-dominated recovery processes (SDRPs) are not commonly used as commercial recovery processes to produce highly viscous oil. Solvent-dominated means that the injectant comprises greater than 50 percent (%) by mass of solvent or that greater than 50% of the produced oil's viscosity reduction is obtained by chemical solvation rather than by thermal means. Highly viscous oils are produced primarily using thermal methods in which heat, typically in the form of steam, is added to the reservoir.

Cyclic solvent-dominated recovery processes (CSDRPs) are a subset of SDRPs. A CSDRP may be a non-thermal recovery method that uses a solvent to mobilize viscous oil by cycles of injection and production. One possible laboratory method for roughly comparing the relative contribution of heat and dilution to the viscosity reduction obtained in a proposed oil recovery process is to compare the viscosity obtained by diluting an oil sample with a solvent to the viscosity reduction obtained by heating the sample.

In a CSDRP, a solvent composition may be injected through a well into a subterranean formation, causing pressure to increase. Next, the pressure is lowered and reduced-viscosity oil is produced to the surface of the subterranean formation through the same well through which the solvent was injected. Multiple cycles of injection and production may be used. CSDRPs may be particularly attractive for thinner or lower-oil-saturation reservoirs. In such reservoirs, thermal methods utilizing heat to reduce viscous oil viscosity may be inefficient due to excessive heat loss to the overburden and/or underburden and/or reservoir with low oil content.

References describing specific CSDRPs include: Canadian Patent No. 2,349,234 (Lim et al.); G. B. Lim et al., "Three-dimensional Scaled Physical Modeling of Solvent Vapour Extraction of Cold Lake Bitumen," *The Journal of Canadian Petroleum Technology*, 35(4), pp. 32-40 (April 1996); G. B. Lim et al., "Cyclic Stimulation of Cold Lake Oil Sand with Supercritical Ethane," *SPE Paper* 30298 (1995); U.S. Pat. No. 3,954,141 (Allen et al.); and M. Feali et al., "Feasibility Study of the Cyclic VAPEX Process for Low Permeable Carbonate Systems," *International Petroleum Technology Conference Paper* 12833 (2008).

The family of processes within the Lim et al. references describes a particular SDRP that is also a CSDRP. These processes relate to the recovery of heavy oil and bitumen from subterranean reservoirs using cyclic injection of a solvent in the liquid state which vaporizes upon production.

With reference to FIG. 1, which is a simplified diagram based on Canadian Patent No. 2,349,234 (Lim et al.), one CSDRP process is described as a single well method for cyclic solvent stimulation, the single well preferably having a horizontal wellbore portion and a perforated liner section. A vertical wellbore 101 driven through overburden 102 into reservoir 103 and is connected to a horizontal wellbore portion 104. The horizontal wellbore portion 104 comprises a perforated liner section 105 and an inner bore 106. The horizontal wellbore portion comprises a downhole pump 107. In operation, solvent or viscosified solvent is driven down and diverted through the perforated liner section 105 where it percolates into reservoir 103 and penetrates reservoir material to yield a reservoir penetration zone 108. Oil dissolved in the solvent or viscosified solvent flows into the well and is pumped by downhole pump 107 through an inner bore 106 through a motor at the wellhead 109 to a production tank 110 where oil and solvent are separated and the solvent is recycled to be reused in the process. Each instance of injection of solvent and production of oil dissolved in solvent is considered a "cycle."

In a SDRP, one of the key metrics to measure the efficiency of the process is solvent intensity (solvent volume used per unit of hydrocarbon production), which may also be expressed as a solvent to oil ratio (ratio of solvent injected to oil produced), similar to the steam to oil ratio used in thermal recovery processes. In a CSDRP, solvent volumes injected grow cycle over cycle, and the efficiency of the process is reduced. Solvents can also vary in price and availability. Therefore, efficient and effective use and recovery of solvents are key to the economics and robustness of a SDRP.

SUMMARY

The present disclosure provides methods for optimizing solvent use and reducing solvent intensity in CSDRP. In some embodiments, the methods include injecting a solvent composition into an underground reservoir at a pressure above a liquid/vapor phase change pressure of the solvent composition; injecting a chaser into the reservoir at a pressure above the liquid/vapor phase change pressure of the solvent composition; allowing the solvent composition to mix with hydrocarbons in the reservoir and at least partially dissolve into the hydrocarbons to produce a solvent/hydrocarbon mixture; reducing the pressure in the reservoir below the liquid/vapor phase change pressure of the solvent composition thereby flowing at least a fraction of the solvent/hydrocarbon mixture from the reservoir; and repeating these steps as required. In other embodiments, the chaser may comprise between 1% and 80% of the total injected volume at any given cycle, wherein "total injected volume" is understood to mean the aggregate volume of solvent composition and chaser injected during a given cycle. The ratio of chaser volume to the total injected volume may increase, decrease or remain the same over consecutive cycles.

The chaser may replace part of the solvent to be injected in CSDRP to help reduce the solvent use, restore or maintain the reservoir pressure, and also to push the solvent further into the reservoir for better mixing with oil. The chaser can be water, gas, or any other non-hydrocarbon fluid. The chaser can be wholly or partially obtained from the same operation of the CSDRP, or derived from other commercial operations (e.g. cyclic steam stimulation, steam-assisted gravity drainage, etc.), or a different source that is readily available on site. For example, produced water from CSDRP, disposal water at elevated temperature from the thermal operations, flue gas, or any other sources that contain one or more components of water, C1, $CO_2$, $N_2$, etc. may provide sources of chaser agents.

The foregoing has broadly outlined the features of the present disclosure so that the detailed description that follows may be better understood. Additional features will also be described herein.

BRIEF DESCRIPTION OF THE DRAWINGS

These and other features, aspects and advantages of the disclosure will become apparent from the following description, appending claims and the accompanying drawings, which are briefly described below.

Figure 1:
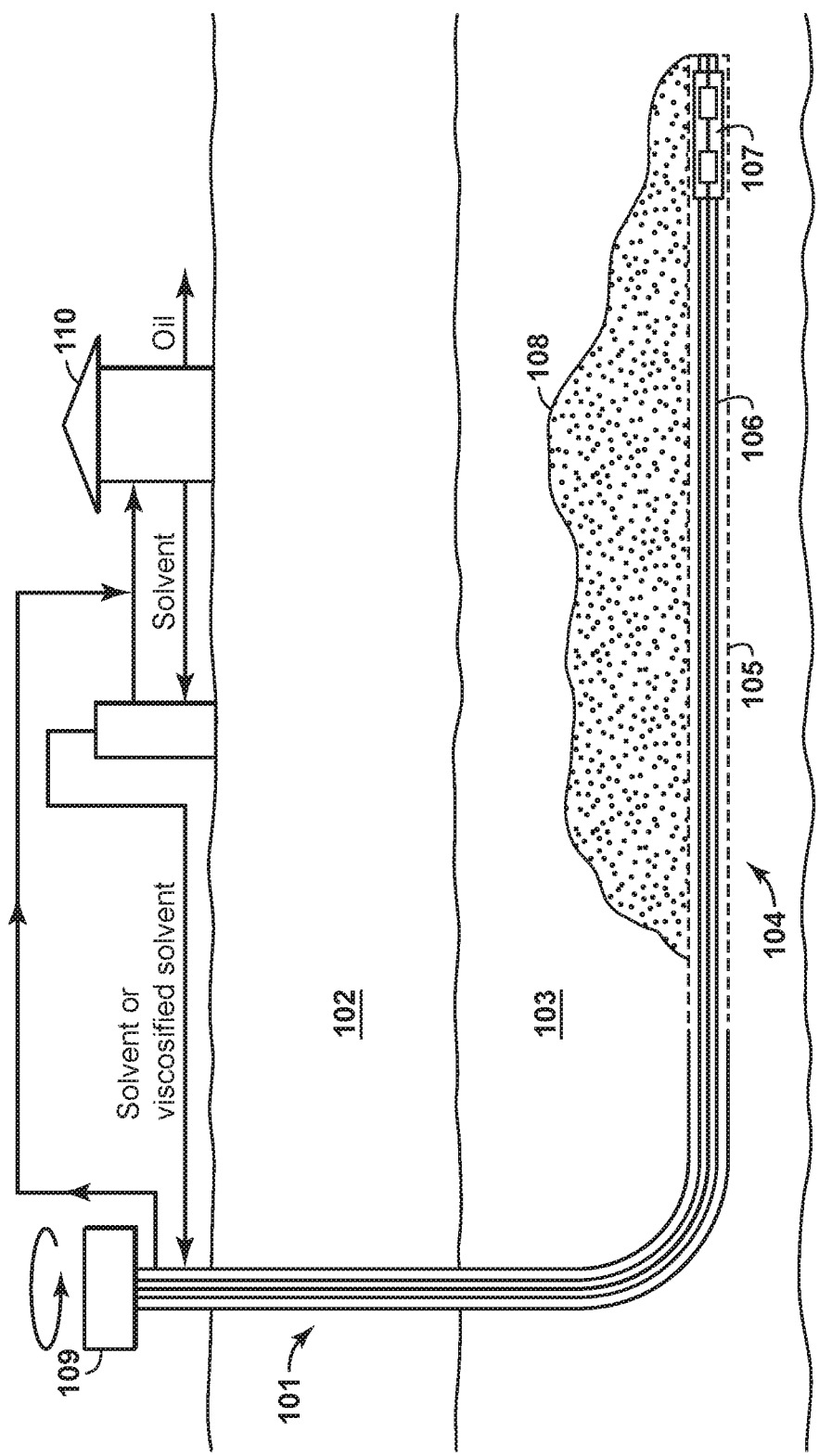
FIG. 1 is an exemplary schematic of a cyclic solvent-dominated recovery process.

It should be noted that the figures are merely examples and no limitations on the scope of the present disclosure are intended thereby. Further, schematics are generally not drawn to scale, but are drafted for purposes of convenience and clarity in illustrating various aspects of the disclosure. Certain features and components herein may be shown exaggerated in scale or in schematic form and some details of conventional elements may not be shown in the interest of clarity and conciseness. When referring to the figures described herein, the same reference numerals may be referenced in multiple figures for the sake of simplicity.

DETAILED DESCRIPTION

To promote an understanding of the principles of the disclosure, reference will now be made to the features illustrated in the drawings and no limitation of the scope of the disclosure is hereby intended. Any alterations and further modifications, and any further applications of the principles of the disclosure as described herein are contemplated as would normally occur to one skilled in the art to which the disclosure relates. For the sake of clarity, some features not relevant to the present disclosure may not be shown in the drawings.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As one of ordinary skill would appreciate, different persons may refer to the same feature or component by different names. This document does not intend to distinguish between components or features that differ in name only. In the following description and in the claims, the terms "including" and "comprising" are used in an open-ended fashion, and thus, should be interpreted to mean "including, but not limited to."

A "hydrocarbon" is an organic compound that primarily includes the elements of hydrogen and carbon, although nitrogen, sulfur, oxygen, metals, or any number of other elements may be present in small amounts. Hydrocarbons generally refer to components found in heavy oil or in oil sands. Hydrocarbon compounds may be aliphatic or aromatic, and may be straight chained, branched, or partially or fully cyclic.

"Bitumen" is a naturally occurring heavy oil material. Generally, it is the hydrocarbon component found in oil sands. Bitumen can vary in composition depending upon the degree of loss of more volatile components. It can vary from a very viscous, tar-like, semi-solid material to solid forms. The hydrocarbon types found in bitumen can include aliphatics, aromatics, resins, and asphaltenes. A typical bitumen might be composed of:

- 19 weight (wt.) percent (%) aliphatics (which can range from 5 wt. % to 30 wt. % or higher);
- 19 wt. % asphaltenes (which can range from 5 wt. % to 30 wt. % or higher);
- 30 wt. % aromatics (which can range from 15 wt. % to 50 wt. % or higher);
- 32 wt. % resins (which can range from 15 wt. % to 50 wt. % or higher); and
- some amount of sulfur (which can range in excess of 7 wt. %), based on the total bitumen weight.

In addition, bitumen can contain some water and nitrogen compounds ranging from less than 0.4 wt. % to in excess of 0.7 wt. %. The percentage of the hydrocarbon found in bitumen can vary. The term "heavy oil" includes bitumen as well as lighter materials that may be found in a sand or carbonate reservoir.

"Heavy oil" includes oils which are classified by the American Petroleum Institute ("API"), as heavy oils, extra heavy oils, or bitumens. The term "heavy oil" includes bitumen. Heavy oil may have a viscosity of about 1,000 centipoise (cP) or more, 10,000 cP or more, 100,000 cP or more, or 1,000,000 cP or more. In general, a heavy oil has an API gravity between 22.3° API (density of 920 kilograms per meter cubed ($kg/m^3$) or 0.920 grams per centimeter cubed ($g/cm^3$)) and 10.0° API (density of 1,000 $kg/m^3$ or 1 $g/cm^3$). An extra heavy oil, in general, has an API gravity of less than 10.0° API (density greater than 1,000 $kg/m^3$ or 1 $g/cm^3$). For example, a source of heavy oil includes oil sand or bituminous sand, which is a combination of clay, sand, water and bitumen.

The term "viscous oil" as used herein means a hydrocarbon, or mixture of hydrocarbons, that occurs naturally and that has a viscosity of at least 10 cP at initial reservoir conditions. Viscous oil includes oils generally defined as "heavy oil" or "bitumen." Bitumen is classified as an extra heavy oil, with an API gravity of about 10° or less, referring to its gravity as measured in degrees on the API Scale. Heavy oil has an API gravity in the range of about 22.3° to about 10°. The terms viscous oil, heavy oil, and bitumen are used interchangeably herein since they may be extracted using similar processes.

In-situ is a Latin phrase for "in the place" and, in the context of hydrocarbon recovery, refers generally to a subsurface hydrocarbon-bearing reservoir. For example, in-situ temperature means the temperature within the reservoir. In another usage, an in-situ oil recovery technique is one that recovers oil from a reservoir within the earth.

The term "subterranean formation" refers to the material existing below the Earth's surface. The subterranean formation may comprise a range of components, e.g. minerals such as quartz, siliceous materials such as sand and clays, as well as the oil and/or gas that is extracted. The subterranean formation may be a subterranean body of rock that is distinct and continuous. The terms "reservoir" and "formation" may be used interchangeably.

The term "wellbore" as used herein means a hole in the subsurface made by drilling or inserting a conduit into the subsurface. A wellbore may have a substantially circular cross section or any other cross-sectional shape. The term "well," when referring to an opening in the formation, may be used interchangeably with the term "wellbore."

The articles "the," "a" and "an" are not necessarily limited to mean only one, but rather are inclusive and open ended to include, optionally, multiple such elements.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure.

"At least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, to at least one, optionally including more than one, A, with no B present (and optionally including entities other than B); to at least one, optionally including more than one, B, with no A present (and optionally including entities other than A); to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

Where two or more ranges are used, such as but not limited to 1 to 5 or 2 to 4, any number between or inclusive of these ranges is implied.

As used herein, the phrases "for example," "as an example," and/or simply the terms "example" or "exemplary," when used with reference to one or more components, features, details, structures, methods and/or figures according to the present disclosure, are intended to convey that the described component, feature, detail, structure, method and/or figure is an illustrative, non-exclusive example of components, features, details, structures, methods and/or figures according to the present disclosure. Thus, the described component, feature, detail, structure, method and/or figure is not intended to be limiting, required, or exclusive/exhaustive; and other components, features, details, structures, methods and/or figures, including structurally and/or functionally similar and/or equivalent components, features, details, structures, methods and/or figures, are also within the scope of the present disclosure. Any embodiment or aspect described herein as "exemplary" is not to be construed as preferred or advantageous over other embodiments.

CSDRP Process Description

Figure 2:
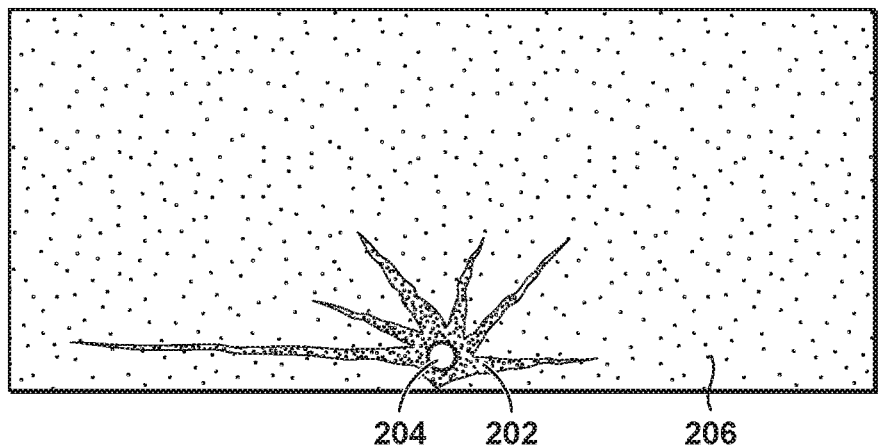
FIG. 2 is an exemplary schematic of solvent composition "fingering" into oil sands during CSDRP.

During CSDRP, a reservoir may accommodate injected solvent composition and non-solvent fluid (also referred to as "additional injectants" or "non-solvent injectants") by dilating a reservoir pore space by applying an injection pressure. As illustrated in FIG. 2, the solvent composition 202 injected through wellbore 204 "fingers" into the oil sands 206. The solvent composition 202 then mixes with the viscous oil to yield a reduced viscosity mixture with higher mobility than the native viscous oil. "Fingering" may occur when two fluids of different viscosities come in contact with one another and one fluid penetrates the other in a finger-like pattern, that is, in an uneven manner.

The primary mixing mechanism of the solvent with the oil may be dispersive mixing, not diffusion. The solvent composition injected in each cycle may replace the volume of previously recovered fluid and may add additional fluid to contact previously uncontacted viscous oil. The injection well and the production well may utilize a common wellbore.

While producing hydrocarbon during CSDRP, pressure may be reduced and the solvent composition, any non-solvent injectant, and viscous oil may flow back to the same well in which the solvent and non-solvent injectant were injected, to be produced to the surface of the reservoir as produced fluid. The produced fluid may be a mixture of the solvent composition and viscous oil (herein referred as "solvent/hydrocarbon mixture"). Each instance of solvent injection and production of a solvent/hydrocarbon mixture is considered a CSDRP cycle.

As the pressure in the reservoir falls, the produced fluid rate may decline with time. Production of the produced fluid may be governed by any of the following mechanisms: gas drive via solvent vaporization and native gas exsolution, compaction drive as the reservoir dilation relaxes, fluid expansion, and gravity-driven flow. The relative importance of the mechanisms depends on static properties such as solvent properties, native GOR (Gas to Oil Ratio), fluid and rock compressibility characteristics, and/or reservoir depth. The relative importance of the mechanism may depend on operational practices such as solvent injection volume, producing pressure, and/or viscous oil recovery to-date, among other factors.

CSDRP—Solvent Composition

The solvent may be a light, but condensable, hydrocarbon or mixture of hydrocarbons comprising ethane, propane, butane, or pentane. The solvent may comprise at least one of ethane, propane, butane, pentane, and carbon dioxide. The solvent may comprise greater than 50% C2-C5 hydrocarbons on a mass basis. The solvent may be greater than 50 mass % propane, optionally with diluent when it is desirable to adjust the properties of the injectant to improve performance.

Additional injectants may include $CO_2$, natural gas, C5+ hydrocarbons, ketones, and alcohols. Non-solvent injectants that are co-injected with the solvent may include steam, non-condensable gas, or hydrate inhibitors. The solvent composition may comprise at least one of diesel, viscous oil, natural gas, bitumen, diluent, C5+ hydrocarbons, ketones, alcohols, non-condensable gas, water, biodegradable solid particles, salt, water soluble solid particles, and solvent soluble solid particles.

To reach a desired injection pressure of the solvent composition, a viscosifier and/or a solvent slurry may be used in conjunction with the solvent. The viscosifier may be useful in adjusting solvent viscosity to reach desired injection pressures at available pump rates. The viscosifier may include diesel, viscous oil, bitumen, and/or diluent. The viscosifier may be in the liquid, gas, or solid phase. The viscosifier may be soluble in either one of the components of the injected solvent and water. The viscosifier may transition to the liquid phase in the reservoir before or during production. In the liquid phase, the viscosifiers are less likely to increase the viscosity of the produced fluids and/or decrease the effective permeability of the formation to the produced fluids.

The solvent composition may be as described in Canadian Patent No. 2,645,267 (Chakrabarty, issued Apr. 16, 2013). The solvent composition may comprise (i) a polar component, the polar component being a compound comprising a non-terminal carbonyl group; and (ii) a non-polar component, the non-polar component being a substantially aliphatic substantially non-halogenated alkane. The solvent composition may have a Hansen hydrogen bonding parameter of 0.3 to 1.7 (or 0.7 to 1.4). The solvent composition may have a volume ratio of the polar component to non-polar component of 10:90 to 50:50 (or 10:90 to 24:76, 20:80 to 40:60, 25:75 to 35:65, or 29:71 to 31:69). The polar component may be, for instance, a ketone or acetone. The non-polar component may be, for instance, a C2-C7 alkane, a C2-C7 n-alkane, an n-pentane, an n-heptane, or a gas plant condensate comprising alkanes, naphthenes, and aromatics. For further details and explanation of the Hansen Solubility Parameter System see, for example, Hansen, C. M. and Beerbower, Kirk-Othmer, Encyclopedia of Chemical Technology, (Suppl. Vol. 2nd Ed), 1971, pp 889-910 and "Hansen Solubility Parameters A User's Handbook" by Charles Hansen, CRC Press, 1999.

The solvent composition may be as described in Canadian Patent No. 2,781,273 (Chakrabarty, issued May 20, 2014). The solvent composition may comprise (i) an ether with 2 to 8 carbon atoms; and (ii) a non-polar hydrocarbon with 2 to 30 carbon atoms. Ether may have 2 to 8 carbon atoms. Ether may be di-methyl ether, methyl ethyl ether, di-ethyl ether, methyl iso-propyl ether, methyl propyl ether, di-isopropyl ether, di-propyl ether, methyl iso-butyl ether, methyl butyl ether, ethyl iso-butyl ether, ethyl butyl ether, iso-propyl butyl ether, propyl butyl ether, di-isobutyl ether, or di-butyl ether. Ether may be di-methyl ether. The non-polar hydrocarbon may a C2-C30 alkane. The non-polar hydrocarbon may be a C2-C5 alkane. The non-polar hydrocarbon may be propane. The ether may be di-methyl ether and the hydrocarbon may be propane. The volume ratio of ether to non-polar hydrocarbon may be 10:90 to 90:10; 20:80 to 70:30; or 22.5:77.5 to 50:50.

The solvent composition may comprise at least 5 mol % of a high-aromatics component (based upon total moles of the solvent composition) comprising at least 60 wt. % aromatics (based upon total mass of the high-aromatics component). As described in Canadian Patent No. 2,900,178 (Wang et al., issued Sep. 6, 2016), one suitable and inexpensive high-aromatics component is gas oil from a catalytic cracker of a hydrocarbon refining process, also known as a light catalytic gas oil (LCGO).

CSDRP—Phase of Injected Solvent

The solvent composition may be injected into the well at a pressure in the underground reservoir above a liquid/vapor phase change pressure such that at least 25 mass % of the solvent enters the reservoir in the liquid phase. At least 50, 70, or even 90 mass % of the solvent may enter the reservoir in the liquid phase. Injection of the solvent composition as a liquid may be preferred for increasing solvent injection pressure. The solvent composition may be injected into the well at rates and pressures such that immediately after completing injection into the well at least 25 mass % of the injected solvent is in a liquid state in the reservoir (e.g., underground).

A fraction of the solvent may be injected in the solid phase in order to mitigate adverse solvent fingering, increase injection pressure, and/or keep the average distance of the solvent closer to the wellbore than in the case of pure liquid phase injection. Less than 20 mass % of the injectant may enter the reservoir in the solid phase. Less than 10 mass % or less than 50 mass % of the solvent may enter the reservoir in the solid phase. Once in the reservoir, the solid phase of the solvent may transition to a liquid phase before or during production to prevent or mitigate reservoir permeability reduction during production.

Injection of the solvent as a vapor may assist uniform solvent distribution along a horizontal well, particularly when variable injection rates are targeted. Vapor injection in a horizontal well may facilitate an upsize in the port size of installed inflow control devices (ICDs) that minimize the risk of plugging the ICDs. Injecting the solvent as a vapor may increase the ability to pressurize the reservoir to a desired pressure by lowering effective permeability of the injected vapor in a formation comprising liquid viscous oil.

A non-condensable gas may be injected into the reservoir to achieve a desired pressure, along with or followed by injection of the solvent. Injecting a primarily non-condensable gas followed by primarily solvent injection (where primarily means greater than 50 mass % of the mixture of non-condensable gas and solvent) may provide a way to maintain the desired injection pressure target. A non-solvent injectant in the vapor phase, such as $CO_2$ or natural gas, may be injected, followed by injection of the solvent composition.

Although a CSDRP may be predominantly a non-thermal process in that heat is not used principally to reduce the viscosity of the viscous oil, the use of heat is not excluded. Heating may be beneficial to improve performance, improve process start-up, or provide flow assurance during production. For start-up, low-level heating (for example, less than 100° C.) may be appropriate. Low-level heating of the solvent prior to injection may also be performed to prevent hydrate formation in tubulars and in the reservoir. Heating to higher temperatures may benefit recovery. Two non-exclusive scenarios of injecting a heated solvent are as follows. In one scenario, vapor solvent would be injected and would condense before it reaches the bitumen. In another scenario, a vapor solvent would be injected at up to 200° C. and would become a supercritical fluid at downhole operating pressure.

CSDRP—Pore Volume

As described in Canadian Patent No. 2,734,170 (Dawson et al., issued Sep. 24, 2013), one method of managing fluid injection in a CSDRP is for the cumulative volume injected over all injection periods in a given cycle ($V_{INJECTANT}$) to equal the net reservoir voidage ($V_{VOIDAGE}$) resulting from previous injection and production cycles plus an additional volume ($V_{ADDITIONAL}$), for example approximately 2-15%, or approximately 3-8% of the pore volume (PV) of the reservoir volume associated with the well pattern. In mathematical terms, the volume (V) may be represented by:

$$V_{INJECTANT} = V_{VOIDAGE} + V_{ADDITIONAL}$$

One way to approximate the net in-situ volume of fluids produced is to determine the total volume of non-solvent liquid hydrocarbon fraction produced ($V_{PRODUCED\ OIL}$) and aqueous fraction produced ($V_{PRODUCED\ WATER}$) minus the net injectant fractions produced ($V_{INJECTED\ SOLVENT} - V_{PRODUCED\ SOLVENT}$). For example, in the case where 100% of the injectant is solvent and the reservoir contains only oil and water, an equation that represents the net in-situ volume of fluids produced ($V_{VOIDAGE}$) is:

$$V_{VOIDAGE} = V_{OIL}^{PRODUCED} + V_{WATER}^{PRODUCED} - (V_{SOLVENT}^{INJECTED} - V_{SOLVENT}^{PRODUCED})$$

CSDRP—Diluent

In the context of this specification, diluent means a liquid compound that can be used to dilute the solvent and can be used to manipulate the viscosity of any resulting solvent/hydrocarbon mixture. By such manipulation of the viscosity of the solvent/hydrocarbon (and diluent) mixture, the invasion, mobility, and distribution of solvent in the reservoir can be controlled so as to increase viscous oil production.

The diluent is typically a viscous hydrocarbon liquid, especially a C4-C20 hydrocarbon, or mixture thereof, may be locally produced and may be used to thin bitumen to pipeline specifications. Pentane, hexane, and heptane may be components of such diluents. Bitumen itself can be used to modify the viscosity of the solvent, often in conjunction with ethane solvent.

The diluent may have an average initial boiling point close to the boiling point of pentane (36° C.) or hexane (69° C.) though the average boiling point (defined further below) may change with reuse as the mix changes (some of the solvent originating among the recovered viscous oil fractions). More than 50% by volume of the diluent may have an average boiling point lower than the boiling point of decane (174° C.). More than 75% by volume, such as more than 80% by volume or more than 90% by weight of the diluent, may have an average boiling point between the boiling point of pentane and the boiling point of decane. The diluent may have an average boiling point close to the boiling point of hexane (69° C.) or heptane (98° C.), or even water (100° C.).

More than 50% by weight of the diluent (such as more than 75% or 80% by weight or more than 90% by weight) may have a boiling point between the boiling points of pentane and decane. More than 50% by weight of the diluent may have a boiling point between the boiling points of hexane (69° C.) and nonane (151° C.), particularly between the boiling points of heptane (98° C.) and octane (126° C.).

CSDRP—Reservoir Performance

As described in Canadian Patent No. 2,900,179 (Wang et al.), CSDRP performance may further be improved by using a solvent mixture that has multiple components with different saturation pressures at a certain temperature, i.e., the solvent mixture exhibits liquid-vapor phase behavior over a range of pressures, to address drops in reservoir pressure changes that increase bitumen viscosity and reduce bitumen production rates.

The solvent composition may comprise multiple components with different saturation pressures at a certain temperature. The solvent composition may be in a liquid phase upon injection. A viscosity-reducing component (greater than 50 mol %) of the solvent composition, such as propane or dimethyl ether, may remain in the liquid phase during most of the production period, playing its role of reducing the bitumen viscosity. The solvent composition may also include more volatile components (e.g., C1 or C2) that can easily vaporize when production pressure drops, providing additional gas drive to enhance production. To enhance the performance further, the difference between the pressure at which gas exsolution initiates and a lower bound where all or most solvent has been vaporized may be maximized. This may be achieved by replacing a small fraction of the viscosity-reducing component (e.g., 5-20 mol %) with a heavier solvent having higher solubility and lower vapor pressure.

The solvent composition may thus have two components having a difference in vaporization pressure (at the temperature of the reservoir) greater than 200 kPa. The first component may comprise greater than 50 mol % ethane, propane, butane, pentane, heptane, hexane, dimethyl ether, or a combination thereof, based upon total moles of the first component. The first component may comprise between 5 mol % and 30 mol % of hydrocarbons with a molecular weight of at least 58 g/mol, based upon total moles of the first component. The first component may comprise at least 50 mol % diluent, based upon total moles of the first component.

The second component may comprise at least 10 mol % methane, based on total moles of the solvent composition.

The second component may have an average molecular weight of less than 33 g/mol. The second component may comprise greater than 50 mol % methane, ethane, carbon dioxide, or a combination thereof, based upon total moles of the second component.

The first component may comprise (i) a polar component, the polar component being a compound comprising a non-terminal carbonyl group; and (ii) a non-polar component, the non-polar component being a substantially aliphatic substantially non-halogenated alkane. The first component may have a Hansen hydrogen bonding parameter of 0.3 to 1.7 and the volume ratio of the polar component to the non-polar component may be 10:90 to 50:50. The polar component may be a ketone or acetone. The non-polar component may be a C2-C7 alkane, a C2-C7 n-alkane, an n-pentane, an n-heptane, or a gas plant condensate comprising alkanes, naphthenes, and aromatics.

The first component may comprise (i) an ether with 2 to 8 carbon atoms; and (ii) a non-polar hydrocarbon with 2 to 30 carbon atoms. The ether may be di-methyl ether, methyl ethyl ether, di-ethyl ether, methyl iso-propyl ether, methyl propyl ether, di-isopropyl ether, di-propyl ether, methyl iso-butyl ether, methyl butyl ether, ethyl iso-butyl ether, ethyl butyl ether, iso-propyl butyl ether, propyl butyl ether, di-isobutyl ether, or di-butyl ether. The non-polar hydrocarbon may be a C2-C30 alkane, a C2-05 alkane, or propane. The volume ratio of the ether to the non-polar hydrocarbon may be 10:90 to 90:10.

TABLE 1

Operating Ranges for a CSDRP

| Parameter | Broader Option | Narrower Option |
| --- | --- | --- |
| Cumulative injectant volume per cycle | Fill-up estimated pattern pore volume plus a cumulative 3-8% of estimated pattern pore volume; or inject, beyond a primary pressure threshold, for a cumulative period of time (e.g. days to months); or inject, beyond a primary pressure threshold, a cumulative of 3-8% of estimated pore volume. | Inject a cumulative volume in a cycle, beyond a primary pressure threshold, of 3-8% of estimated pore volume. |
| Injectant composition, main | Main solvent (>50 mass %) $C_2$-$C_5$. Alternatively, wells may be subjected to compositions other than main solvents to improve well pattern performance (i.e. $CO_2$ flooding of a mature operation or altering in-situ stress of reservoir). $CO_2$ | Main solvent (>50 mass %) is propane ($C_3$) or ethane ($C_2$). |
| Injectant composition, additive | Additional injectants may include $CO_2$ (up to about 30 mass %), $C_{3+}$, viscosifiers (e.g. diesel, viscous oil, bitumen, diluent), ketones, alcohols, sulphur dioxide, hydrate inhibitors, steam, non-condensable gas, biodegradable solid particles, salt, water soluble solid particles, or solvent soluble solid particles. | Only diluent, and only when needed to achieve adequate injection pressure. Or, a polar compound having a non-terminal carbonyl group (e.g. a ketone, for instance acetone). |
| Injectant phase & Injection pressure | Solvent injected such that at the end of the injection cycle, greater than 25% by mass of the solvent exists as a liquid and less than 50% by mass of the injectant exists in the solid phase in the reservoir, with no constraint as to whether most solvent is injected above or below dilation pressure or fracture pressure. | Solvent injected as a liquid, and most solvent injected just under fracture pressure and above dilation pressure, $P_{fracture} > P_{injection} > P_{dilation} > P_{vapor}$ |
| Injectant temperature | Enough heat to prevent hydrates and locally enhance wellbore inflow consistent with Boberg-Lantz mode | Enough heat to prevent hydrates with a safety margin, $T_{hydrate} + 5°$ C. to $T_{hydrate} + 50°$ C. |
| Injection rate during continuous injection | 0.1 to 10 m³/day per meter of completed well length (rate expressed as volumes of liquid solvent at reservoir conditions). | 0.2 to 6 m³/day per meter of completed well length (rate expressed as volumes of liquid solvent at reservoir conditions). Rates may also be designed to allow for limited or controlled fracture extent, at fracture pressure or desired solvent conformance depending on reservoir properties. |
| Threshold pressure (pressure at which solvent continues to be injected for either a period of time or in a volume amount) | Any pressure above initial reservoir pressure. | A pressure between 90% and 100% of fracture pressure. |

TABLE 1-continued

Operating Ranges for a CSDRP

| Parameter | Broader Option | Narrower Option |
|---|---|---|
| Well length | As long of a horizontal well as can practically be drilled; or the entire pay thickness for vertical wells. | 500 m-1500 m (commercial well). |
| Well configuration | Horizontal wells parallel to each other, separated by some regular spacing of 20-1000 m. Also vertical wells, high angle slant wells & multi-lateral wells. Also infill injection and/or production wells (of any type above) targeting bypassed hydrocarbon from surveillance of pattern performance. | Horizontal wells parallel to each other, separated by some regular spacing of 50-600 m. |
| Well orientation | Orientated in any direction. | Horizontal wells orientated perpendicular to (or with less than 30 degrees of variation) the direction of maximum horizontal in-situ stress. |
| Minimum producing pressure (MPP) | Generally, the range of the MPP should be, on the low end, a pressure significantly below the vapor pressure, ensuring vaporization; and, on the high-end, a high pressure near the native reservoir pressure. For example, perhaps 0.1 MPa (megapascals)-5 MPa, depending on depth and mode of operation (all-liquid or limited vaporization). | A low pressure below the vapor pressure of the main solvent, ensuring vaporization, or, in the limited vaporization scheme, a high pressure above the vapor pressure. At 500 m depth with pure propane, 0.5 MPa (low)-1.5 MPa (high), values that bound the 800 kPa vapor pressure of propane. |
| Oil rate | Switch to injection when rate equals 2 to 50% of the max rate obtained during the cycle. Alternatively, switch when absolute rate equals a pre-set value. Alternatively, well is unable to sustain hydrocarbon flow (continuous or intermittent) by primary production against backpressure of gathering system or well is "pumped off" unable to sustain flow from artificial lift. Alternatively, well is out of sync with adjacent well cycles. | Switch when the instantaneous oil rate declines below the calendar day oil rate (CDOR) (e.g. total oil/total cycle length). Likely most economically optimal when the oil rate is at about $0.5 \times$ CDOR. Alternatively, switch to injection when rate equals 20-40% of the max rate obtained during the cycle. |
| Gas rate | Switch to injection when gas rate exceeds the capacity of the pumping or gas venting system. Well is unable to sustain hydrocarbon flow (continuous or intermittent) by primary production against backpressure of gathering system with or without compression facilities. | Switch to injection when gas rate exceeds the capacity of the pumping or gas venting system. During production, an optimal strategy is one that limits gas production and maximizes liquid from a horizontal well. |
| Oil to Solvent Ratio | Begin another cycle if the OISR of the just completed cycle is above 0.15 or economic threshold. | Begin another cycle if the OISR of the just completed cycle is above 0.25. |
| Abandonment pressure (pressure at which well is produced after CSDRP cycles are completed) | Atmospheric or a value at which all of the solvent is vaporized. Steps e) and f) (described below) may start from this point at the same or higher pressure. | For propane and a depth of 500 m, about 340 kPa, the likely lowest obtainable bottomhole pressure at the operating depth and well below the value at which all of the propane is vaporized. Steps e) and f) (described below) may start from this point at the same or higher pressure. |

Table 1 outlines the operating ranges for certain CSDRPs. The present disclosure is not intended to be limited by such operating ranges.

In Table 1, the options may be formed by combining two or more parameters and, for brevity and clarity, each of these combinations will not be individually listed.

Figure 3:
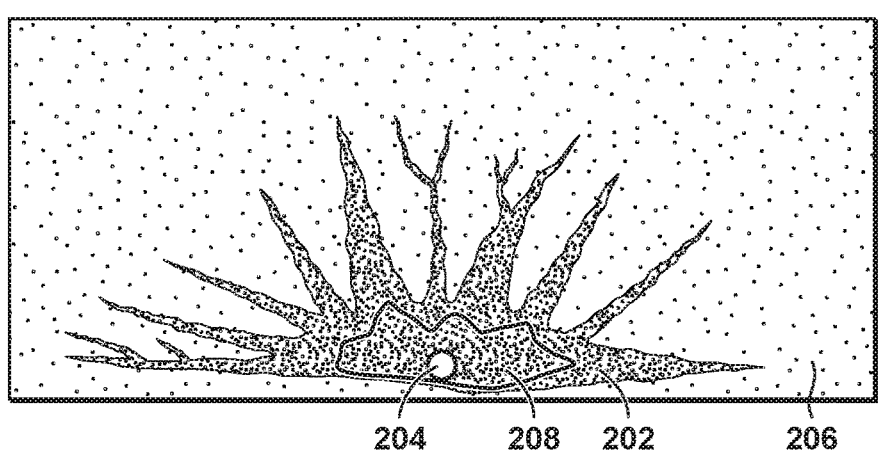
FIG. 3 is an exemplary schematic of a low utilization zone of solvent composition in CSDRP.

In CSDRP, cycles may grow progressively in length and the volume of solvent needed for efficient recovery increase accordingly as viscous oil is recovered and the well is depleted. In later cycles, large volumes of solvent composition must often be injected to re-pressurize the formation and fill voidage created as a result of reservoir fluid (oil, gas, water, etc.) production. More specifically, as shown in FIG. 3, as the solvent composition 202 replaces the volume of recovered viscous oil, the solvent composition 202 near the wellbore 204 is not fully utilized for mixing and viscosity reduction. This "low utilization zone" 208 is mainly used to fill voidage and maintain pressurization. Employing solvent (which is relatively expensive compared to other injectants) in the low utilization zone 208 essentially as a filling agent significantly reduces CSDRP efficiency and increases operational costs.

Solvent Chasing

Figure 4:
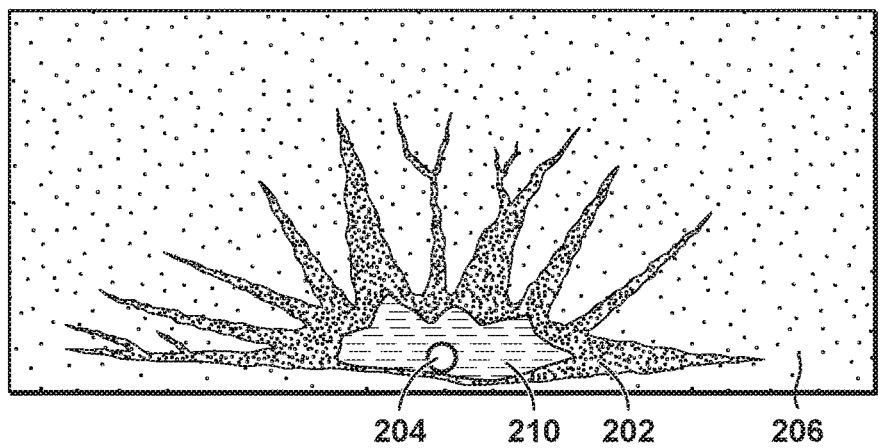
FIG. 4 is an exemplary schematic of chaser replacing solvent composition in a low utilization zone in CSDRP.

Solvent use in CSDRP may be optimized to reduce solvent intensity by implementing some aspects of the present disclosure. With reference to FIG. 4, as "fingers" grow during CSDRP cycles, part or all solvent composition 202 that would have been injected in a given cycle may be replaced with a "chaser" 210. The chaser 210 may be water, gas, or any other non-hydrocarbon fluid that is different from the solvent composition 202 and safe to operate with. The chaser 210 may be cheaper than the solvent composition or more readily available. Preferably, the chaser 210 may be a non-compressible liquid (e.g., water) or low molecular weight gas (e.g., methane). For example, acceptable chasers 210 may include water (fresh, brackish, procuded, disposal, steam condensate), gas (C1, $CO_2$, $N_2$, flue gas from boilers) or any combination thereof.

Injecting a chaser 210 during certain CSDRP cycles may assist in pressure maintenance and forcing solvent composition 202 further into the reservoir for enhancing solvent/oil contact and mixing. By reducing solvent use and utilizing instead a more economical substance as chaser 210, CSDRP process economics may be improved.

The target temperature of the chaser 210 may be higher than the initial temperature of the reservoir or, in some embodiments, between 10 and 300° C., or for water, between 10 and 90° C. In some embodiments, the density of the chaser 210 may be greater than the density of the solvent composition 202 at reservoir conditions, preferably >10% greater than the density of the solvent composition 202.

The chaser 210 may be injected at any CSDRP cycle, and may be omitted during one or more intervening cycles. In some embodiments, the chaser 210 may be injected after the second or third CSDRP cycle or when oil sands 206 near the wellbore 204 have been depleted. Injection of solvent composition 202 and chaser 210 can alternate multiple times within a cycle with the first slug of injection being solvent.

In some embodiments, for cycles including chaser injection, the chaser 210 may be injected toward the end of an injection cycle following injection of solvent composition 202 during the same cycle. In this way, the chaser 210 may fill voidage created by the solvent composition 202 permeating increasing volumes within the reservoir and help maintain a desired pressure and penetration of the solvent composition 202. The amount of chaser 210 relative to the solvent composition 202 volume may be any amount, preferably in the range between 1% and 80% in any given cycle. In some embodiments, the amount of chaser 210 injected into the well relative to the solvent composition 202 volume may remain constant and in others it may progressively increase over cycles, or decrease over cycles, or alternate between periods of gradual increase and gradual decrease. Preferably, the chaser 210 may account for between 1% and 10% of the total injected fluid by volume in the first injection cycle including chaser, and gradually increase to a maximum of 80% of the total injected fluid by volume.

As discussed above, one method of managing chaser injection in a CSDRP is for the cumulative volume injected over all injection periods in a given cycle ($V_{INJECTANT}$) to equal the net reservoir voidage ($V_{VOIDAGE}$) resulting from previous injection and production cycles plus an additional volume ($V_{ADDITIONAL}$). When use of a chaser is incorporated into the process and $V_{INJECTANT}$ is equal to the sum of the volume of solvent ($V_{SOLVENT}$) and the volume of chaser ($V_{CHASER}$), the latter may be represented in mathematical terms by:

$$V_{CHASER} = V_{VOIDAGE} + V_{ADDITIONAL} - V_{SOLVENT}$$

The chaser 210 may be injected at a pressure above the liquid/vapor change pressure of the solvent composition 202 and, preferably, at a similar or same pressure as the solvent composition, in the range of 1,000-10,000 kPa.

Liquid chaser can be injected into the reservoir using the same injection system as the solvent composition, but one or more separate storage tanks may be used to store the chaser. A gas chaser may benefit from using a compressor and multiphase injection system. A recovered liquid chaser such as water can be separated from the produced solvent/hydrocarbon mixture on the surface by gravity separation and then sent to storage tanks for re-injection. Recovered gas chaser may be mostly produced from the casing and then compressed for re-injection.

Figure 5:
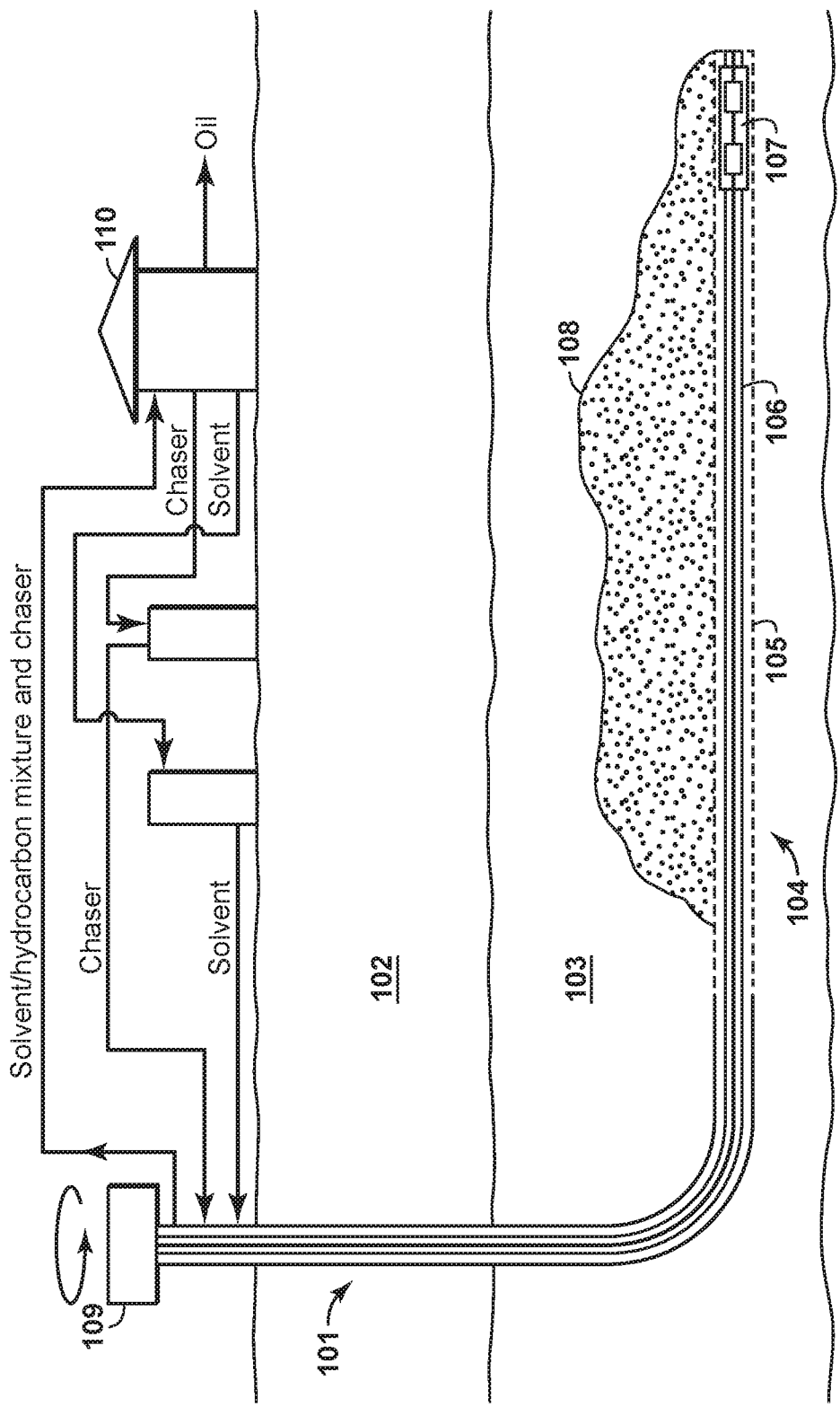
FIG. 5 is an exemplary schematic of a CSDRP incorporating solvent chasing according to certain aspects of the present disclosure.

For example, as shown in FIG. 5, the chaser may be injected into overburden 102 and reservoir 103 using the same wellbore 101 and horizontal wellbore portion 104 used to inject the solvent composition. The chaser may percolate to the reservoir penetration zone 108 through the perforated liner section 105 following the solvent composition. As does oil dissolved in the solvent, the chaser may flow back into the well and be pumped by the downhole pump 107 through the inner bore 106 through the motor at the wellhead 109 to a production tank 110, where the chaser may be separated from the solvent and oil to be stored in a separate tank from the solvent and reused in the CSDRP process.

In some embodiments, the chaser may be derived from a variety of hydrocarbon recovery processes. In embodiments in which water is employed as chaser, the water may be fresh or recycled water, water produced during a CSDRP process (with some make-up water as needed), or disposal water from other processes. For example, water produced during (i) steam-assisted gravity drainage (SAGD) processes; (ii) solvent-assisted SAGD (SA-SAGD) processes; (iii) expanding solvent SAGD (ES-SAGD) processes; (iv) cyclic steam simulation (CSS) processes; or (v) cyclic solvent processes (CSP) may be utilized in an adjacent CSDRP site as chaser 210. In this way, processes and methods according to the present disclosure may be integrated with existing steam-based operations to utilize disposal water. One benefit of doing so is that disposed water may have a temperature higher than the ambient temperature of the reservoir, which can range between 5 and 30° C. in heavy oil reservoirs in Canada. This residual heat may aid the solvent/oil mixing process in CSDRP by reducing the oil viscosity further, as well as potentially mitigating flow assurance issues.

In some embodiments, the chaser 210 may be heated by other means, such as by utilizing residual heat from separation processes already incorporated into CSDRP. In particular, while the oil and chaser 210 (e.g., water) may be separated using gravity-based processes, the remaining solvent/oil mixture may be separated employing processes that involve heating the mixture. Some of this heat may be further employed to heat the chaser 210. In some embodiments, the chaser 210 may have a temperature anywhere between 10 and 300° C., or between 10 and 90° C. for water, when injected into the well. Alternatively, the chaser 210 may have a temperature between 20 and 250° C. above the ambient temperature of the reservoir, or more preferably about 60° C. above the ambient temperature of the reservoir.

One measure of efficiency in CSDRP is the ratio of produced oil volume to injected solvent volume over a time interval, or "oil to injected solvent ratio" (OISR). The time interval may be one complete injection/production cycle. The time interval may be from the beginning of first injection to the present or some other time interval. When the ratio falls below a certain threshold, further solvent composition injection may become uneconomic. OISR is only one measure of solvent efficiency, and those skilled in the art will recognize there are other measures of solvent recovery, such as solvent storage ratio (SSR), percentage loss, volume of unrecovered solvent per volume of recovered oil, or its inverse, the volume of produced oil to volume of lost solvent ratio (OLSR).

Simulations on an exemplary underground reservoir with horizontal wells of commercial scale (i.e., 1000 meters long at 100 meters well spacing) illustrate the benefits of the disclosed methods over conventional CSDRP. The parameters selected to model a reservoir in this study represent a typical heavy oil reservoir with the following properties:

Porosity ~0.35
Gross thickness ~30 m
Bitumen saturation ~8 wt %
Initial temperature 16° C.
Initial pressure 3000 KPa
In-situ bitumen viscosity 200,000-1,000,000 cP The simulations are intended as an example only, and the disclosed methods may be utilized with a variety of well configurations and sizes, such as different well lengths and spacings, different well layout and vertical separations, as well as different well orientations. In addition, this disclosure contemplates ratios between chaser and total injected volume that may remain constant or vary over cycles, or may range 1 and 80% over any cycle as discussed above.

Three models were simulated and compared. The first model (Case 1) was a CSDRP utilizing pure propane as the solvent composition for all cycles. In the second model (Case 2) was based on injecting water as chaser at the end of injection cycles, starting with cycle 3. The injected water volume was 20% of the total cycle injection volume. Finally, the third model (Case 3) was similar to the second but the water (i.e., chaser) content was increased from 20% of the total cycle injection volume in cycle 3 to 60% in cycle 7 (in 10% increments over each cycle).

Figure 6:
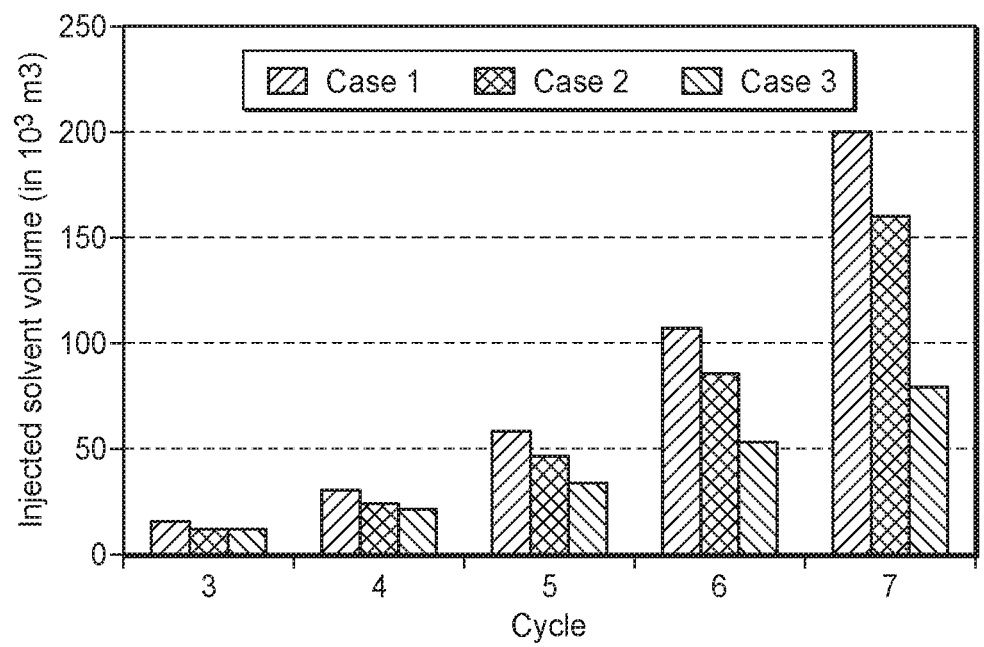
FIG. 6 is a graph of simulated injected solvent composition volumes over CSDRP cycles.

FIG. 6 is a graph illustrating the solvent injection volume (in $10^3$ m$^3$) for cycles 3 to 7 for each of the models. (Cycles 1 and 2 are not shown as they involve injecting pure solvent [propane] and are identical for the three models.) As can be observed in FIG. 6, the injected solvent volume decreases in Cases 2 and 3 compared to Case 1 over successive cycles. In particular, for Case 2 which involves a constant chaser/solvent ratio (1/4) for cycle 3 and beyond, the injected solvent volume remains 80% of the total volume injected for every cycle after cycle 2 in Case 1, while the amount of injected solvent in Case 3 progressively decreases starting at cycle 3 compared to Case 1 to reach 40% in cycle 7.

Figure 7:
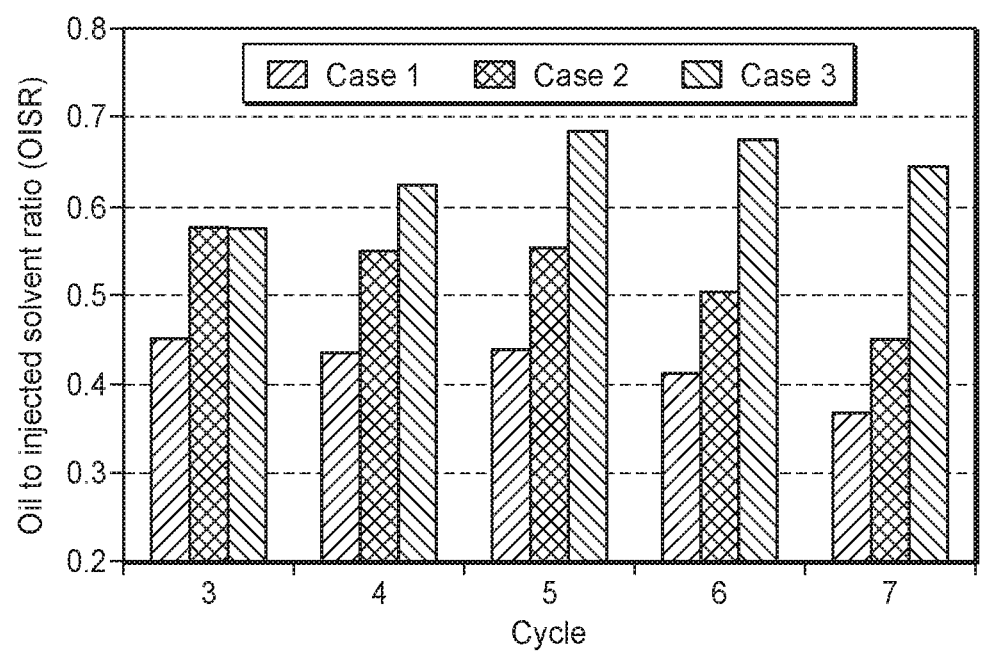
FIG. 7 is a graph of simulated Oil to Injected Solvent Ratios over CSDRP cycles.

FIG. 7 is a graph illustrating the OISR for cycles 3 to 7 in each model. As shown in the graph, the OISR gradually decreases over time for Case 1, given that increasing solvent volumes are necessary to reach viscous oil in the formation as the oil is depleted and the solvent necessarily has to fill larger voidage to mix with the remaining oil. In contrast, Case 2 exhibits higher OISR over time compared to Case 1 because the injected solvent volume is necessarily lower. Notably, the decrease in OISR for Case 2 remains roughly proportionally constant compared to Case 1, suggesting that simply using a constant chaser/solvent ratio may prolong the economic viability of a CSDRP over time.

Even more advantageously, the OISR for Case 3 shown in FIG. 7 initially increased over cycles 3 to 5, and slightly dropped over cycles 6 and 7. The OISR in cycle 3 was the same for Cases 2 and 3, given that both began with a chaser amount of 20% of total injected volume in cycle 3. But as the ratio of chaser to total injected volume increased (from 20% to 60% over five cycles), it can be appreciated in FIG. 7 that the difference in OISR for Cases 2 and 3 continuously increased, suggesting that oil can be recovered with less and less solvent even as the formation gets depleted.

Figure 8:
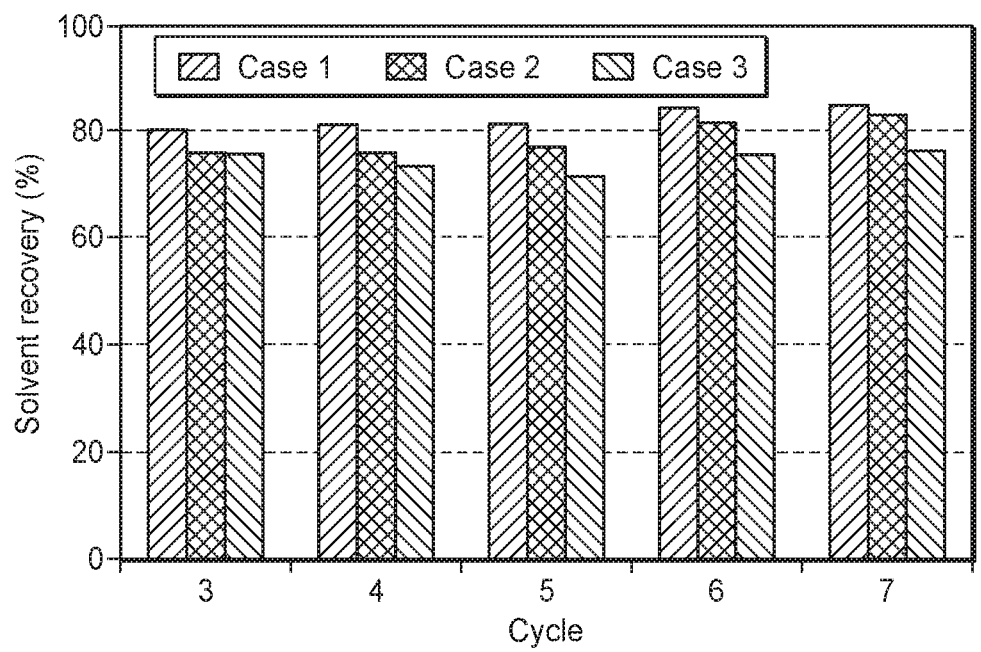
FIG. 8 is a graph of simulated solvent recovery percentages over CSDRP cycles.

FIG. 8 plots the percentage of solvent that is recovered after each cycle for each model. The percentage for Case 1 slightly increases over time from 80% to about 84-85%. While solvent recovery is marginally lower for Case 2 (about 75% initially) it also increases over time to reach about 82-83% in cycle 7. Unlike Cases 1 and 2, however, Case 3 exhibits a slight decrease in solvent recovery in cycles 4 and 5, returning to roughly the same level in cycle 7 as in cycle 3. In other words, gradually increasing the chaser/solvent ratio as in Case 3 results in a remarkable improvement in OISR over CSDRP cycles while solvent recovery is minimally affected. While only 7-cycle results are presented here for illustration, the ultimate solvent recovery in all the cases after cycle 8 and blow-down reaches above 90%.

Figure 9:
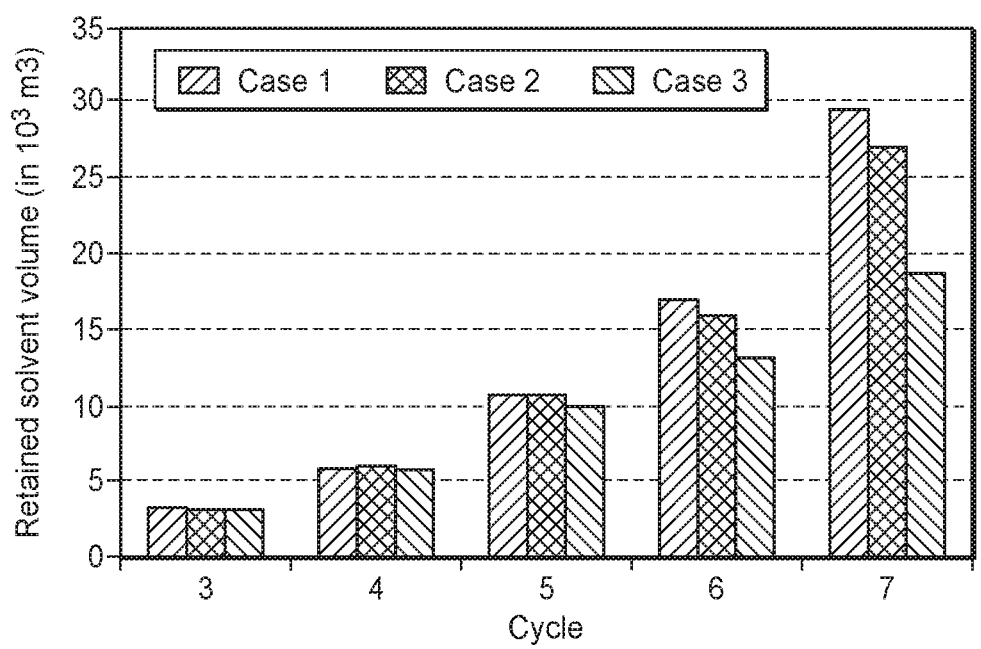
FIG. 9 is a graph of retained solvent volumes over CSDRP cycles.

These advantages are further appreciated in FIG. 9, which shows that, even though the percentage of solvent recovery may be lower for Case 3 compared to Cases 1 and 2, the absolute amount of solvent lost is still lower for Case 3. In other words, progressively increasing the ratio of chaser to total injected volume over consecutive cycles may further result in overall reduced solvent use in CSDRP processes incorporating solvent chasing.

Given the lower operational costs expected from using inexpensive chasers instead of solvent composition to fill voidage in CSDRP cycles, the advantages of the methods disclosed herein are clearly demonstrated. Although not included in these simulations, the advantages over pure solvent composition CSDRP cycles may be expected to be more significant if the chaser is further heated before injection or hot disposal water from another source is used as chaser.

Figure 10:
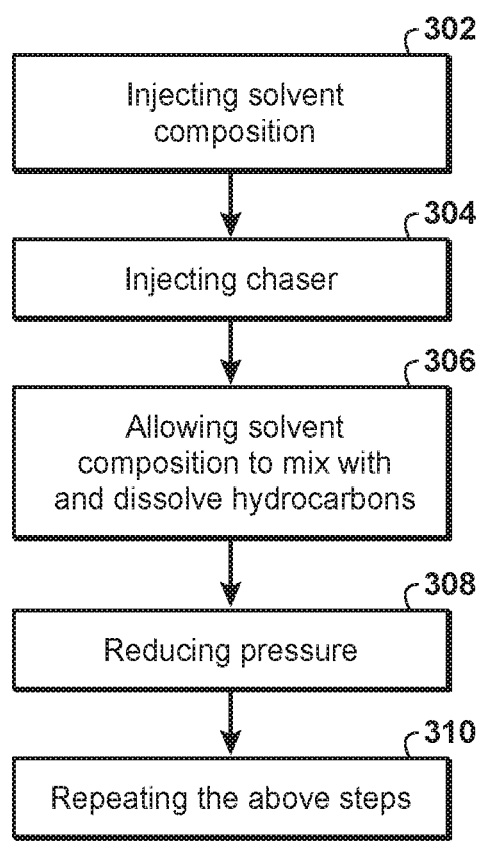
FIG. 10 is a flow chart of a method of recovering hydrocarbons according to the present disclosure.

With reference to FIG. 10, a method for recovering hydrocarbons from an underground reservoir may comprise: (a) injecting a solvent composition into the reservoir at a pressure above a liquid/vapor phase change pressure of the solvent composition (302); (b) injecting a chaser into the reservoir at a pressure above the liquid/vapor phase change pressure of the solvent composition (304); (c) allowing the solvent composition to mix with the hydrocarbons and at least partially dissolve into the hydrocarbons to produce a solvent/hydrocarbon mixture (306); (d) reducing the pressure in the reservoir below the liquid/vapor phase change pressure of the solvent composition thereby flowing at last a fraction of the solvent/hydrocarbon mixture from the reservoir (308); and (e) repeating steps (a) to (d) as required (310). In some embodiments, step 310 may comprise increasing or decreasing the ratio of chaser volume injected in step 308 to the total injected volume of solvent composition and chaser injected in a given cycle. Reducing the pressure in step 308 may further result in flowing at least a portion of the chaser injected in step 304 from the reservoir thereby producing a recovered chaser. In yet other embodiments, step 310 may further include reusing at least a portion of recovered chaser as the chaser injected in step 304 when the process is repeated. Step 310 may be preceded by one or more cycles comprising steps 302, 306 and 308, and omitting step 304.

Additional Description

By way of example, the following clauses are offered as further description of the present disclosure:

Embodiment 1

A method for recovering hydrocarbons from an underground reservoir, the method comprising: (a) injecting a solvent composition into the reservoir at a pressure above a liquid/vapor phase change pressure of the solvent composition; (b) injecting a chaser into the reservoir at a pressure above the liquid/vapor phase change pressure of the solvent composition; (c) allowing the solvent composition to mix with the hydrocarbons and at least partially dissolve into the hydrocarbons to produce a solvent/hydrocarbon mixture; (d) reducing the pressure in the reservoir below the liquid/vapor phase change pressure of the solvent composition thereby flowing at last a fraction of the solvent/hydrocarbon mixture from the reservoir; and (e) repeating steps (a) to (d) as required.

Embodiment 2

The method of embodiment 1, wherein a ratio of the volume of the chaser injected in step (b) to the total injected volume of solvent composition and chaser injected in steps (a) and (b) is between 1% and 80%.

Embodiment 3

The method of embodiments 1 or 2, wherein step (e) comprises increasing or decreasing the ratio of the volume of the chaser injected in step (b) to the total injected volume of solvent composition and chaser injected in steps (a) and (b).

Embodiment 4

The method of any one of embodiments 1 to 3, wherein the chaser includes one of water, steam, methane, $CO_2$, $N_2$, flue gas or a combination of thereof.

Embodiment 5

The method of any one of embodiments 1 to 4, wherein at least a portion of the chaser is derived from at least one of:
(i) a steam-assisted gravity drainage (SAGD) process;
(ii) a solvent-assisted SAGD (SA-SAGD) process;
(iii) an expanding solvent SAGD (ES-SAGD) process;
(iv) cyclic steam stimulation (CSS); and
(v) cyclic solvent processes (CSP).

Embodiment 6

The method of any one of embodiments 1 to 5, wherein reducing the pressure in step (d) further results in flowing at least a portion of the volume of the chaser injected in step (b) from the reservoir thereby producing a recovered chaser.

Embodiment 7

The method of embodiment 6, wherein step (e) further includes reusing at least a portion of the recovered chaser as the chaser when step (b) is repeated.

Embodiment 8

The method of any one of embodiments 1 to 7, wherein the chaser is injected into the reservoir in step (b) at a temperature higher than the initial temperature of the reservoir.

Embodiment 9

The method of any one of embodiments 1 to 8, wherein the chaser is injected into the reservoir in step (b) at a temperature between 10 and 90° C.

Embodiment 10

The method of any one of embodiments 1 to 8, wherein the chaser is injected into the reservoir in step (b) at a temperature between 10 and 300° C.

Embodiment 11

The method of any one of claims 1 to 10, wherein the repeating step (e) is preceded by one or more cycles comprising steps (a), (c) and (d), and omitting step (b).

Embodiment 12

The method of any one of the embodiments 1 to 11, wherein the chaser is injected at a pressure between 1,000 and 10,000 kPa.

Embodiment 13

The method of any one of embodiments 1 to 12, wherein the density of the chaser is greater than the density of the solvent composition at reservoir conditions.

Embodiment 14

The method of any one of embodiments 1 to 13, wherein the density of the chaser is more than 10% greater than the density of the solvent composition at reservoir conditions.

Embodiment 15

The method of any one of embodiments 1 to 14, wherein step (e) comprises reducing an average molecular weight of the solvent composition by at least 10%.

Embodiment 16

The method of any one of embodiments 1 to 15, wherein the solvent composition comprises at least 5 mol % of an aromatic species, based upon total moles of the solvent composition.

Embodiment 17

The method of any one of the embodiments 1 to 17, wherein the solvent composition comprises a first component and a second component that have at least 200 kPa difference in their vaporization pressure at the temperature of the reservoir.

Embodiment 18

The method of embodiment 17, wherein the second component comprises at least 10 mol % methane, based on total moles of the solvent composition.

Embodiment 19

The method of embodiment 17, wherein the second component has an average molecular weight of less than 33 g/mol.

Embodiment 20

The method of any one of embodiments 17 to 19, wherein the first component comprises greater than 50 mol % ethane, propane, butane, pentane, heptane, hexane, dimethyl ether, or a combination thereof, based upon total moles of the first component.

Embodiment 21

The method of any one of embodiments 17 to 19, wherein the first component comprises between 5 mol % and 30 mol % of hydrocarbons with a molecular weight of at least 58 g/mol, based upon total moles of the first component.

Embodiment 22

The method of any one of embodiments 17 to 19, wherein the first component comprises at least 50 mol % diluent, based upon total moles of the first component.

Embodiment 23

The method of any one of embodiments 17 to 22, wherein the second component comprises greater than 50 mol % methane, ethane, carbon dioxide, or a combination thereof, based upon total moles of the second component.

Embodiment 24

The method of any one of embodiments 17 to 19, wherein the first component comprises:
(i) a polar component, the polar component being a compound comprising a non-terminal carbonyl group; and
(ii) a non-polar component, the non-polar component being a substantially aliphatic substantially non-halogenated alkane;
wherein the first component has a Hansen hydrogen bonding parameter of 0.3 to 1.7; and wherein the first component has a volume ratio of the polar component to the non-polar component of 10:90 to 50:50.

Embodiment 25

The method of embodiment 24, wherein the polar component is a ketone or acetone.

Embodiment 26

The method of embodiment 24, wherein the non-polar component is a C2-C7 alkane, a C2-C7 n-alkane, an n-pentane, an n-heptane, or a gas plant condensate comprising alkanes, naphthenes, and aromatics.

Embodiment 27

The method of any of the embodiments 17 to 19, wherein the first component comprises:
(i) an ether with 2 to 8 carbon atoms; and
(ii) a non-polar hydrocarbon with 2 to 30 carbon atoms.

Embodiment 28

The method of embodiment 27, wherein the ether is di-methyl ether, methyl ethyl ether, di-ethyl ether, methyl iso-propyl ether, methyl propyl ether, di-isopropyl ether, di-propyl ether, methyl iso-butyl ether, methyl butyl ether, ethyl iso-butyl ether, ethyl butyl ether, iso-propyl butyl ether, propyl butyl ether, di-isobutyl ether, or di-butyl ether.

Embodiment 29

The method of any one of embodiments 27 or 28, wherein the non-polar hydrocarbon is a C2-C30 alkane, a C2-C5 alkane, or propane.

Embodiment 30

The method of any one of embodiments 1 to 29, wherein injection in steps (a) and (b) and production of the at least a fraction of solvent/hydrocarbon mixture in step (d) are through a common wellbore.

Advantages of the methods disclosed herein over conventional CSDRP include an increase of solvent utilization and efficiency; reduction of solvent demand and storage, leading to simpler commercial solvent supply logistics and lower operational costs; potential integration with existing CSS operations to reduce CSS costs on disposal water and improve CSDRP performance by utilizing the residual heat of CSS disposal water; and better solvent allocation for faster ramp up of bitumen rate in commercial applications with solvent supply constraints.

Disclosed aspects of the present disclosure may include any combinations of the methods and systems shown in the preceding numbered paragraphs. This is not to be considered a complete listing of all possible aspects, as any number of variations can be envisioned from the description above. It should be understood that the numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

What is claimed is:
1. A method for recovering hydrocarbons from an underground reservoir, the method comprising:
(a) injecting a solvent into the reservoir at a pressure above a liquid/vapor phase change pressure of the solvent;
(b) injecting a chaser into the reservoir at a pressure above the liquid/vapor phase change pressure of the solvent;
(c) allowing the solvent to mix with the hydrocarbons and at least partially dissolve into the hydrocarbons to produce a solvent/hydrocarbon mixture;

(d) reducing the pressure in the reservoir below the liquid/vapor phase change pressure of the solvent thereby flowing at last a fraction of the solvent/hydrocarbon mixture from the reservoir; and (e) repeating steps (a) to (d), wherein the composition of the solvent in the repeated steps (a)-(d) is a first solvent composition which is the same as the composition of the solvent in the initial steps (a)-(d), or the composition of the solvent in the repeated steps (a)-(d) is a second solvent further comprising a diluent and has a different composition than the solvent in the initial steps (a)-(d);

wherein the entire injection of the solvent and chaser in steps (a) and (b) and the entire production of the solvent/hydrocarbon mixture in step (d) are through a common wellbore; and wherein the volume of chaser in step (b) is between 1% and 10% of the total injected fluid by volume of the combined solvent and chaser, and the volume of the chaser as a percentage of the total injected fluid by volume of the combined solvent and chaser is increased in multiple repeated cycles of step (e) to a maximum of 80% of the total injected fluid by volume.

2. The method of claim 1, wherein the chaser displaces the solvent within the underground reservoir and reduces the amount of total solvent used in a cycle that is required to restore or maintain the pressure of the underground reservoir.

3. The method of claim 2, wherein the chaser is utilized to push the solvent further into the underground reservoir to improve the mixing of the solvent with the hydrocarbons in the underground reservoir.

4. The method of claim 1, wherein the chaser includes one of water, steam, $CO_2$, $N_2$, flue gas or a combination of thereof.

5. The method of claim 4, wherein at least a portion of the chaser is derived from at least one of:
(i) a steam-assisted gravity drainage (SAGD) process;
(ii) a solvent-assisted SAGD (SA-SAGD) process;
(iii) an expanding solvent SAGD (ES-SAGD) process;
(iv) cyclic steam stimulation (CSS); and
(v) cyclic solvent processes (CSP).

6. The method of claim 1, wherein reducing the pressure in step (d) further results in flowing at least a portion of the volume of the chaser injected in step (b) from the reservoir thereby producing a recovered chaser.

7. The method of claim 6, wherein step (e) further includes reusing at least a portion of the recovered chaser as the chaser when step (b) is repeated.

8. The method of claim 1, wherein the chaser is injected into the reservoir in step (b) at a temperature higher than the initial temperature of the reservoir.

9. The method of claim 1, wherein the chaser is injected into the reservoir in step (b) at a temperature between 10 and 90° C.

10. The method of claim 1, wherein the repeating step (e) is preceded by one or more cycles comprising steps (a), (c) and (d), and omitting step (b).

11. The method of claim 1, wherein the density of the chaser is more than 10% greater than the density of the solvent at reservoir conditions.

12. The method of claim 1, wherein step (e) comprises the second solvent wherein an average molecular weight of the second solvent is at least 10% lower than average molecular weight of the first solvent.

13. The method of claim 1, wherein the solvent comprises at least 5 mol % of an aromatic species, based upon total moles of the solvent.

14. The method of claim 1, wherein the solvent comprises a first component and a second component that have at least 200 kPa difference in their vaporization pressure at the temperature of the reservoir.

15. The method of claim 14, wherein the second component comprises at least 10 mol % methane, based on total moles of the solvent.

16. The method of claim 14, wherein the second component has an average molecular weight of less than 33 g/mol.

17. The method of claim 14, wherein the first component comprises between 5 mol % and 30 mol % of hydrocarbons with a molecular weight of at least 58 g/mol, based upon total moles of the first component.

18. The method of claim 17, wherein the second component comprises greater than 50 mol % methane, ethane, carbon dioxide, or a combination thereof, based upon total moles of the second component.

19. The method of claim 14, wherein the first component comprises:
(i) a polar component, the polar component being a compound comprising a non-terminal carbonyl group; and
(ii) a non-polar component, the non-polar component being a substantially aliphatic substantially non-halogenated alkane;
wherein the first component has a Hansen hydrogen bonding parameter of 0.3 to 1.7; and wherein the first component has a volume ratio of the polar component to the non-polar component of 10:90 to 50:50.

20. The method of claim 19, wherein the polar component is a ketone or acetone.

21. The method of claim 19, wherein the non-polar component is a C2-C7 alkane or a gas plant condensate comprising alkanes, naphthenes, and aromatics.

22. The method of claim 14, wherein the first component comprises:
(i) an ether with 2 to 8 carbon atoms; and
(ii) a non-polar hydrocarbon with 2 to 30 carbon atoms.

23. The method of claim 22, wherein the non-polar hydrocarbon is a C2-C5 alkane.

* * * * *